US012659998B2

(12) United States Patent
Su et al.

(10) Patent No.: US 12,659,998 B2
(45) Date of Patent: Jun. 16, 2026

(54) METHOD AND APPARATUS FOR HANDLING COLLISION

(71) Applicant: Telefonaktiebolaget LM Ericsson (publ), Stockholm (SE)

(72) Inventors: Ling Su, Beijing (CN); Zhipeng Lin, Nanjing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 288 days.

(21) Appl. No.: 18/548,965

(22) PCT Filed: Mar. 22, 2022

(86) PCT No.: PCT/EP2022/057516
§ 371 (c)(1),
(2) Date: Sep. 5, 2023

(87) PCT Pub. No.: WO2022/200366
PCT Pub. Date: Sep. 29, 2022

(65) Prior Publication Data
US 2024/0172287 A1      May 23, 2024

(30) Foreign Application Priority Data
Mar. 23, 2021    (WO) ................ PCT/CN2021/082489

(51) Int. Cl.
*H04W 74/0808*      (2024.01)
(52) U.S. Cl.
CPC .............................. *H04W 74/0825* (2013.01)

(58) Field of Classification Search
CPC .... H04L 1/1812; H04L 5/0051; H04W 72/02; H04W 72/0446; H04W 72/1268;
(Continued)

(56) References Cited

U.S. PATENT DOCUMENTS

2019/0335485 A1    10/2019  Kundu et al.
2020/0228248 A1     7/2020  Islam et al.
(Continued)

OTHER PUBLICATIONS

3GPP, "3GPP TS 38.211 V16.4.0", 3rd Generation Partnership Project; Technical Specification Group Radio Access Network; NR; Physical channels and modulation (Release 16), Dec. 2020, 1-43.
(Continued)

*Primary Examiner* — Donald L Mills
(74) *Attorney, Agent, or Firm* — Murphy, Bilak & Homiller, PLLC

(57) ABSTRACT

Embodiments of the present disclosure provide method and apparatus for handling collision. A method performed by a terminal device comprises obtaining at least one first available slot for a first uplink transmission. The method further comprises obtaining at least one second available slot for a second uplink transmission. The method further comprises determining that the at least one first available slot and the at least one second available slot overlap in time by at least one time-overlapping slot. The method further comprises determining whether the at least one time-overlapping slot is used for the first uplink transmission or the second uplink transmission based on one or more collision handling rules. The method further comprises transmitting the first uplink transmission and/or the second uplink transmission to a network device.

22 Claims, 17 Drawing Sheets

(58) Field of Classification Search
 CPC . H04W 72/23; H04W 72/231; H04W 72/232;
 H04W 72/53; H04W 72/569; H04W
 74/0825
 See application file for complete search history.

(56) References Cited

U.S. PATENT DOCUMENTS

| | | | |
|---|---|---|---|
| 2020/0366531 A1 | 11/2020 | Choi et al. | |
| 2021/0195630 A1* | 6/2021 | Taherzadeh Boroujeni | ................. H04W 72/0446 |
| 2022/0123902 A1* | 4/2022 | Panteleev | ............. H04L 1/1887 |
| 2022/0124832 A1* | 4/2022 | Bae | ........................ H04L 5/0094 |
| 2022/0174692 A1* | 6/2022 | Panteleev | ............. H04L 1/0061 |
| 2024/0089970 A1* | 3/2024 | Jung | ..................... H04W 72/21 |
| 2024/0306154 A1* | 9/2024 | Wang | .................... H04L 1/0026 |

OTHER PUBLICATIONS

3GPP, "3rd Generation Partnership Project; Technical Specification Group Radio Access Network; NR; Physical layer procedures for data (Release 15)", 3GPP TS 38.214 V15.11.0, Sep. 2020, 106 pages.
3GPP, "3rd Generation Partnership Project; Technical Specification Group Services and System Aspects; System architecture for the 5G System (5GS); Stage 2 (Release 16)", 3GPP TS 23.501 V16.7.0, Dec. 2020, 450 pages.
Ericsson, "On intra-UE prioritization enablers", 3GPP TSG RAN WG1 Meeting #97, Tdoc R1-1906097, Reno, USA, May 13-17, 2019, 1-11.
3GPP, "3rd Generation Partnership Project; Technical Specification Group Radio Access Network; NR; Multiplexing and channel coding (Release 16)", 3GPP TS 38.212 V16.4.0, Dec. 2020, 1-152.
3GPP, "3rd Generation Partnership Project; Technical Specification Group Radio Access Network; NR; Physical layer procedures for control (Release 16)", 3GPP TS 38.213 V16.4.0, Dec. 2020, 1-181.
3GPP, "3rd Generation Partnership Project; Technical Specification Group Radio Access Network; NR; Physical layer procedures for data (Release 16)", 3GPP TS 38.214 V16.4.0, Dec. 2020, 1-169.
3GPP, "3rd Generation Partnership Project; Technical Specification Group Radio Access Network; NR; Radio Resource Control (RRC) protocol specification (Release 16)", 3GPP TS 38.331 V16.3.1, Jan. 2021, 1-932.
Huawei, et al., "WF on grant-free repetitions", 3GPP TSG RAN WG1 Meeting #88, R1-1703868, Athens, Greece, Agenda item: 8.1.3.4.3, Feb. 13-17, 2017, 1-2.
MCC Support, "Final Report of 3GPP TSG RAN WG1 #102-e v1.0.0", (Online meeting, Aug. 17-28, 2020), 3GPP TSG RAN WG1 Meeting #103-e, R1-2007501, e-Meeting, Oct. 26-Nov. 13, 2020, 1-200.
MCC Support, "Final Report of 3GPP TSG RAN WG1 #103-e v1.0.0", (Online meeting, Oct. 26-Nov. 13, 2020), 3GPP TSG RAN WG1 Meeting #104-e, R1-2100001, e-Meeting, Jan. 25-Feb. 5, 2021, 1-235.
MCC Support, "Final Report of 3GPP TSG RAN WG1 #104-e v1.0.0", (Online meeting, Jan. 25-Feb. 5, 2021), 3GPP TSG RAN WG1 Meeting #104bis-e, R1-2102281, e-Meeting, Apr. 12-20, 2021, 1-178.
WI Rapporteur (China Telecom), "RAN1 agreements for Rel-17 NR coverage enhancements", 3GPP TSG RAN WG1 #107-e, R1-2112899, e-Meeting, Oct. 11-19, 2021, 1-54.
Interdigital, "Intra-UE Prioritization for overlapping PUSCHs", 3GPP RAN WG2 Meeting #108, R2-1914878, Reno, U.S.A, Nov. 18-22, 2019, 1-7.

* cited by examiner

200

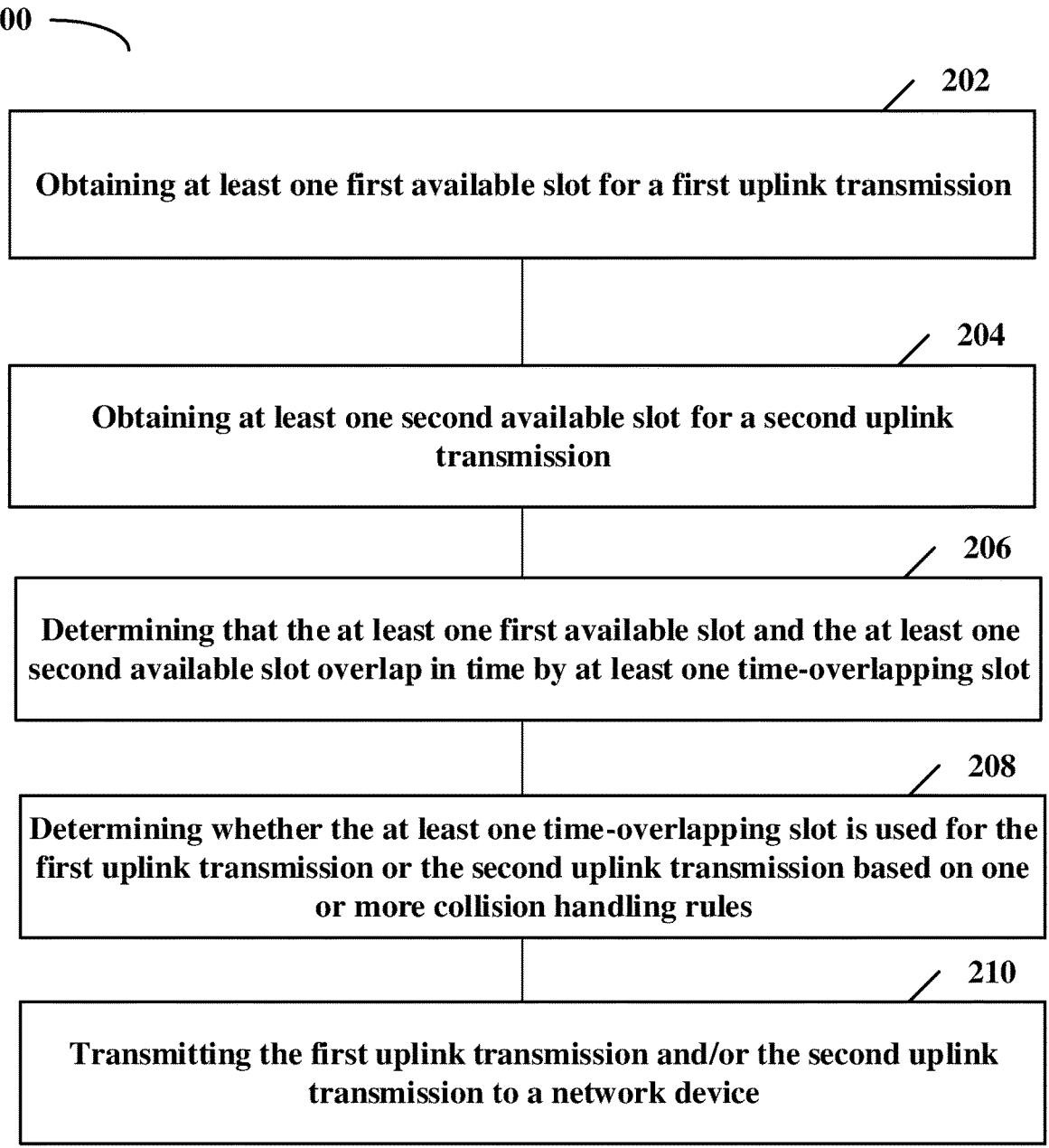

202

Obtaining at least one first available slot for a first uplink transmission

204

Obtaining at least one second available slot for a second uplink transmission

206

Determining that the at least one first available slot and the at least one second available slot overlap in time by at least one time-overlapping slot

208

Determining whether the at least one time-overlapping slot is used for the first uplink transmission or the second uplink transmission based on one or more collision handling rules

210

Transmitting the first uplink transmission and/or the second uplink transmission to a network device

Figures 3, 4:
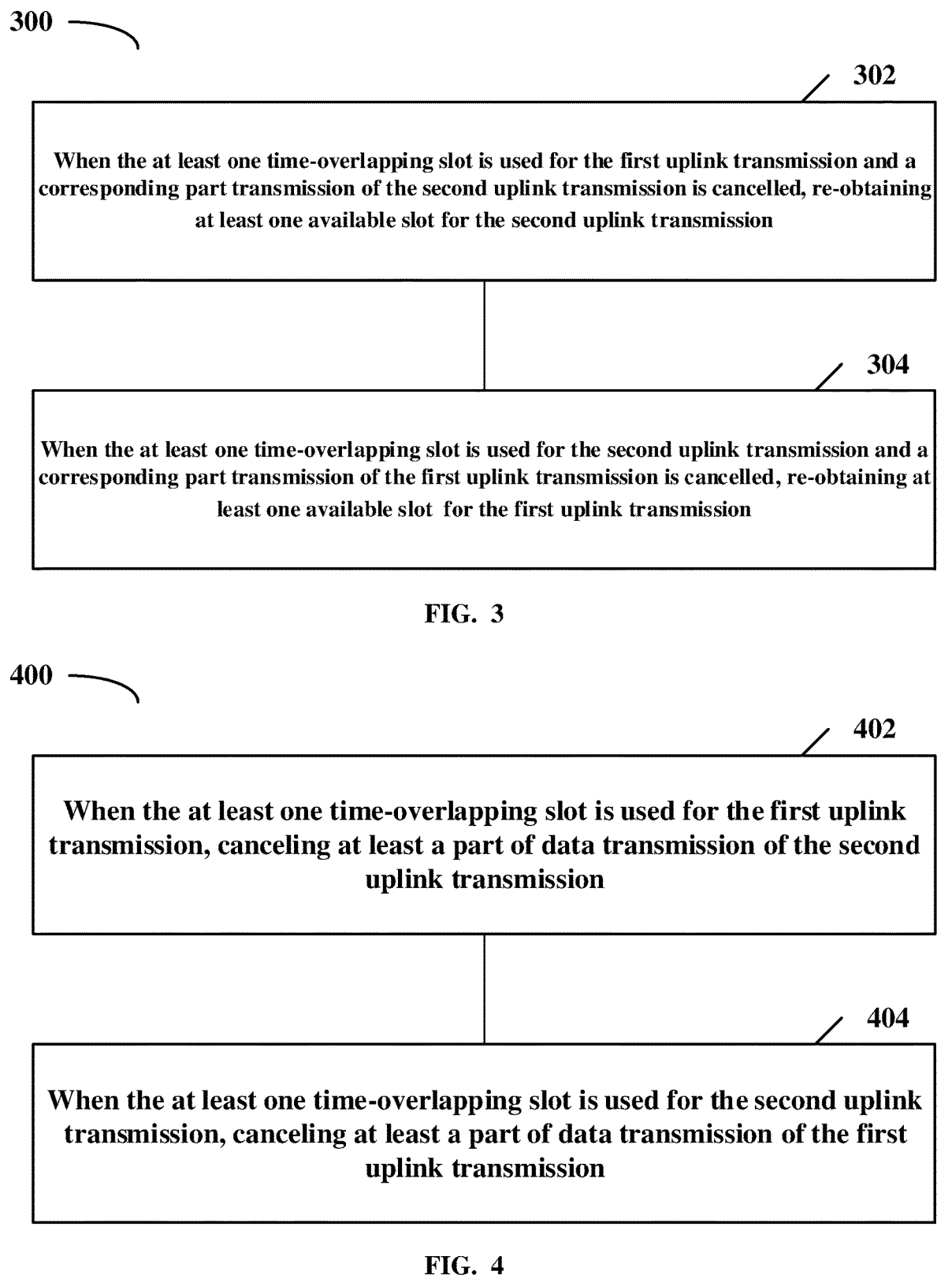

When the at least one time-overlapping slot is used for the first uplink transmission and a corresponding part transmission of the second uplink transmission is cancelled, re-obtaining at least one available slot for the second uplink transmission

304

When the at least one time-overlapping slot is used for the second uplink transmission and a corresponding part transmission of the first uplink transmission is cancelled, re-obtaining at least one available slot for the first uplink transmission

When the at least one time-overlapping slot is used for the first uplink transmission, canceling at least a part of data transmission of the second uplink transmission

404

When the at least one time-overlapping slot is used for the second uplink transmission, canceling at least a part of data transmission of the first uplink transmission

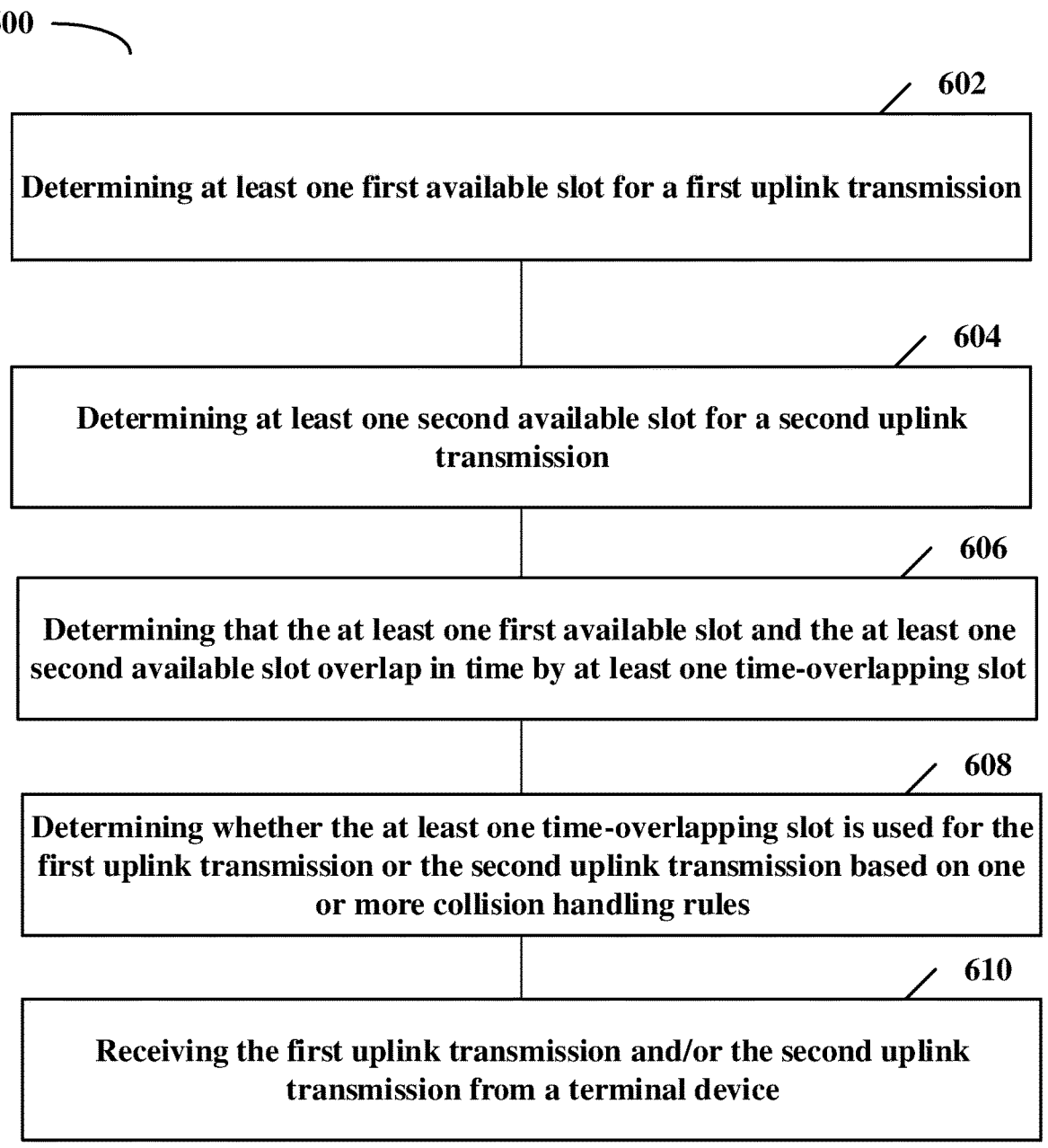

602

Determining at least one first available slot for a first uplink transmission

604

Determining at least one second available slot for a second uplink transmission

606

Determining that the at least one first available slot and the at least one second available slot overlap in time by at least one time-overlapping slot

608

Determining whether the at least one time-overlapping slot is used for the first uplink transmission or the second uplink transmission based on one or more collision handling rules

610

Receiving the first uplink transmission and/or the second uplink transmission from a terminal device

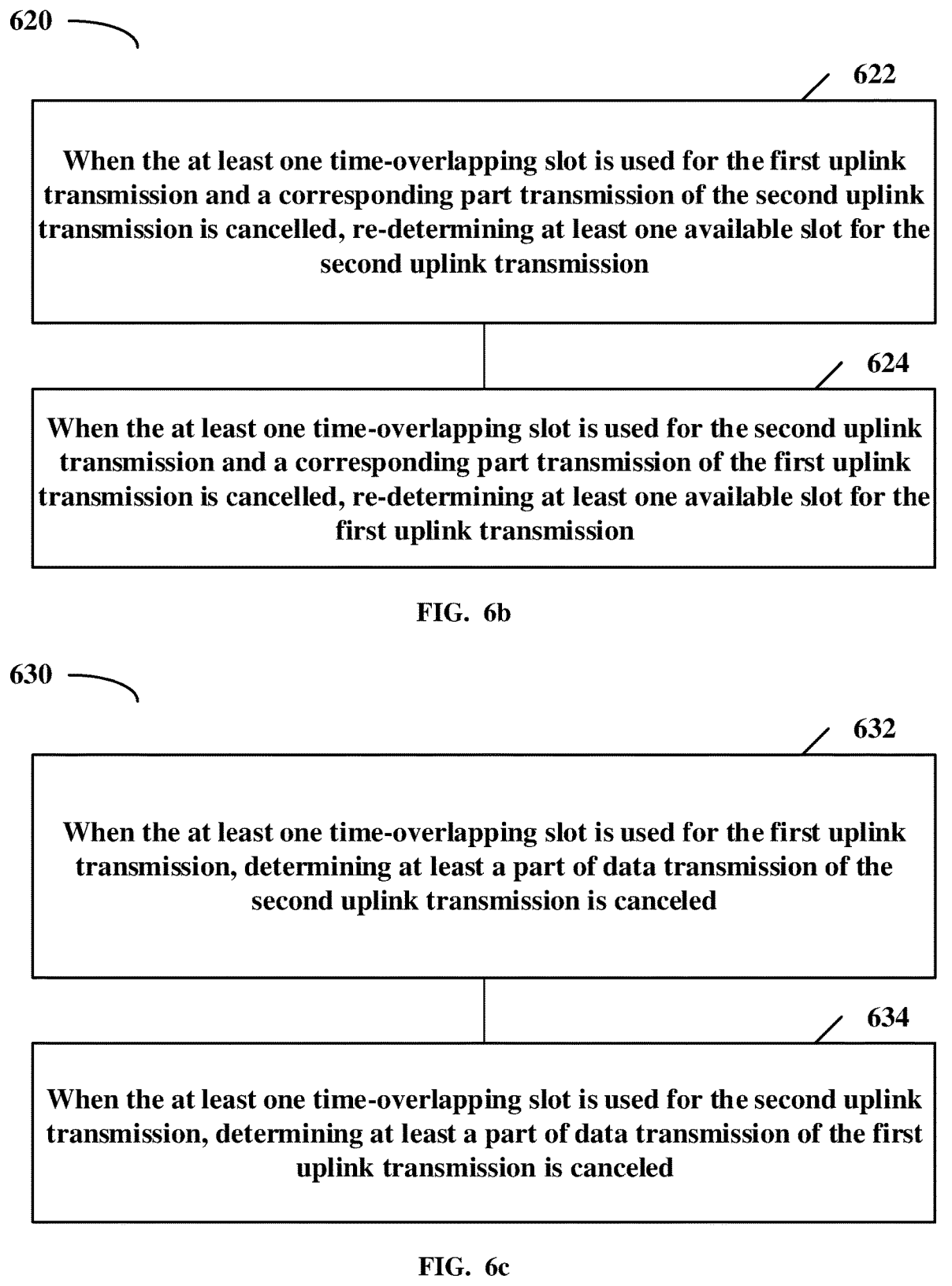

When the at least one time-overlapping slot is used for the first uplink transmission and a corresponding part transmission of the second uplink transmission is cancelled, re-determining at least one available slot for the second uplink transmission

624

When the at least one time-overlapping slot is used for the second uplink transmission and a corresponding part transmission of the first uplink transmission is cancelled, re-determining at least one available slot for the first uplink transmission

When the at least one time-overlapping slot is used for the first uplink transmission, determining at least a part of data transmission of the second uplink transmission is canceled

634

When the at least one time-overlapping slot is used for the second uplink transmission, determining at least a part of data transmission of the first uplink transmission is canceled

FIG. 6c

METHOD AND APPARATUS FOR HANDLING COLLISION

TECHNICAL FIELD

The non-limiting and exemplary embodiments of the present disclosure generally relate to the technical field of communications, and specifically to methods and apparatuses for handling collision.

BACKGROUND

This section introduces aspects that may facilitate a better understanding of the disclosure. Accordingly, the statements of this section are to be read in this light and are not to be understood as admissions about what is in the prior art or what is not in the prior art.

In communication networks for example LTE (Long Term Evolution) and NR (new radio) as defined by 3rd Generation Partnership Project (3GPP), various signals and/or channels may be transmitted in the network. For example, the uplink (UL) signals and/or channels transmitted from a terminal device to a network device may comprises PUSCH (Physical Uplink Shared Channel) (such as PUSCH Repetition Type A), semi-persistent scheduling (SPS) hybrid automatic repeat request (HARQ)-acknowledgement (ACK), sounding reference signal (SRS), etc.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Some UL channels and/or signals may be dropped for different reasons. For example, SPS HARQ-ACK and PUSCH repetitions may be dropped due to conflict with semi-static TDD (Time Division Duplex) configuration. SRS may be dropped due to SRS overlapping in time with PUSCH with a higher physical priority or when high-layer scheduled SRS for positioning conflicts with PUSCH.

SPS HARQ-ACK, A-SRS and PUSCH repetition Type A will be enhanced to solve the issue of dropping in 3GPP NR Release-17 IIoT (Industrial Internet of Things) and URLLC (ultra-reliable and low latency communication) WI (work item), FeMIMO (Further enhanced Multiple Input Multiple Output) WI and NR coverage enhancement WI respectively. One commonality among the solutions is that these UL channels and signals will be on the basis of available UL slots.

It is still being discussed how UE determines available slot for PUSCH repetition Type A, for example either based on only semi-static TDD configuration or both semi-static and dynamic signaling. Another problem needs to be solved is how UE handles the collision if more than one UL channel/signal considers a slot as an available slot.

To overcome or mitigate at least one of above mentioned problems or other problems, the embodiments of the present disclosure propose an improved solution for handling collision.

In a first aspect of the disclosure, there is provided a method performed by a terminal device. The method comprises obtaining at least one first available slot for a first uplink transmission. The method further comprises obtaining at least one second available slot for a second uplink transmission. The method further comprises determining that the at least one first available slot and the at least one second available slot overlap in time by at least one time-overlapping slot. The method further comprises determining whether the at least one time-overlapping slot is used for the first uplink transmission or the second uplink transmission based on one or more collision handling rules. The method further comprises transmitting the first uplink transmission and/or the second uplink transmission to a network device.

In an embodiment, at least one of the one or more collision handling rules is configured by the network device.

In an embodiment, the at least one of the one or more collision handling rules is configured in at least one of a non-physical layer signaling or a physical layer signaling.

In an embodiment, the physical layer signaling comprises downlink control information (DCI).

In an embodiment, at least one of the one or more collision handling rules is predetermined.

In an embodiment, the one or more collision handling rules are determined based on at least one of a time order of scheduling signaling for uplink transmission, a pre-determined priority of uplink transmission, a pre-configured priority of uplink transmission, or a type of scheduling signaling for uplink transmission.

In an embodiment, an earlier scheduled uplink transmission has a higher priority to use the at least one time-overlapping slot than a later scheduled uplink transmission.

In an embodiment, when an uplink transmission is scheduled by a radio resource control (RRC) signaling, a timing of the RRC signaling is determined as an end of a last symbol of physical downlink shared channel (PDSCH) which carries the RRC signaling.

In an embodiment, when an uplink transmission is scheduled by a DCI, a timing of the DCI is determined as an end of a last symbol of PDCCH carrying the DCI.

In an embodiment, semi-persistent scheduling (SPS) hybrid automatic repeat request (HARQ)-acknowledgement (ACK) transmission has a higher priority to use the at least one time-overlapping slot than physical uplink shared channel (PUSCH) transmission.

In an embodiment, PUSCH transmission has a higher priority to use the at least one time-overlapping slot than sounding reference signal (SRS) transmission.

In an embodiment, physical layer signaling scheduled uplink transmission has a higher priority to use the at least one time-overlapping slot than non-physical layer scheduled uplink transmission.

In an embodiment, a higher priority an uplink transmission has, a higher priority the uplink transmission has to use the at least one time-overlapping slot.

In an embodiment, the method further comprises, when the at least one time-overlapping slot is used for the first uplink transmission and a corresponding part transmission of the second uplink transmission is cancelled, re-obtaining at least one available slot for the second uplink transmission.

In an embodiment, the method further comprises, when the at least one time-overlapping slot is used for the second uplink transmission and a corresponding part transmission of the first uplink transmission is cancelled, re-obtaining at least one available slot for the first uplink transmission.

In an embodiment, re-obtaining at least one available slot for the second uplink transmission comprises re-obtaining at least one available slot for transmitting data supposed to be transmitted in the cancelled corresponding part transmission of the second uplink transmission, or re-obtaining at least one available slot for transmitting data supposed to be transmitted in at least one slot corresponding to the cancelled corresponding part transmission of the second uplink transmission.

In an embodiment, re-obtaining at least one available slot for the first uplink transmission comprises re-obtaining at least one available slot for transmitting data supposed to be transmitted in the cancelled corresponding part transmission of the first uplink transmission, or re-obtaining at least one available slot for transmitting data supposed to be transmitted in at least one slot corresponding to the cancelled corresponding part transmission of the first uplink transmission.

In an embodiment, the method further comprises, when the at least one time-overlapping slot is used for the first uplink transmission, canceling at least a part of data transmission of the second uplink transmission.

In an embodiment, the method further comprises, when the at least one time-overlapping slot is used for the second uplink transmission, canceling at least a part of data transmission of the first uplink transmission.

In an embodiment, canceling at least a part of data transmission of the second uplink transmission comprises canceling data transmission of the cancelled corresponding part transmission of the second uplink transmission, or canceling data transmission of at least one slot corresponding to the cancelled corresponding part transmission of the second uplink transmission.

In an embodiment, canceling at least a part of data transmission of the first uplink transmission comprises canceling data transmission of the cancelled corresponding part transmission of the first uplink transmission, or canceling data transmission of at least one slot corresponding to the cancelled corresponding part transmission of the first uplink transmission.

In an embodiment, a cancelled part transmission of uplink transmission is counted for redundancy version pattern determination for the uplink transmission.

In an embodiment, uplink transmission based on available slots comprises at least one of uplink transmission for PUSCH Repetition Type A, uplink transmission for SPS HARQ-ACK, or uplink transmission for SRS.

In an embodiment, collision handling between a triggered enhanced Type A PUSCH repetition transmission and a transmission of SPS HARQ-ACK or SRS is performed after a determination of available slots for counting the triggered enhanced Type A PUSCH repetition transmission.

In a second aspect of the disclosure, there is provided a method performed by a network device. The method comprises determining at least one first available slot for a first uplink transmission. The method further comprises determining at least one second available slot for a second uplink transmission. The method further comprises determining that the at least one first available slot and the at least one second available slot overlap in time by at least one time-overlapping slot. The method further comprises determining whether the at least one time-overlapping slot is used for the first uplink transmission or the second uplink transmission based on one or more collision handling rules. The method further comprises receiving the first uplink transmission and/or the second uplink transmission from a terminal device.

In an embodiment, the method further comprises, when the at least one time-overlapping slot is used for the first uplink transmission and a corresponding part transmission of the second uplink transmission is cancelled, re-determining at least one available slot for the second uplink transmission.

In an embodiment, the method further comprises, when the at least one time-overlapping slot is used for the second uplink transmission and a corresponding part transmission of the first uplink transmission is cancelled, re-determining at least one available slot for the first uplink transmission.

In an embodiment, re-determining at least one available slot for the second uplink transmission comprises re-determining at least one available slot for transmitting data to be transmitted in the cancelled corresponding part transmission of the second uplink transmission, or re-determining at least one available slot for transmitting data to be transmitted in at least one slot corresponding to the cancelled corresponding part transmission of the second uplink transmission.

In an embodiment, re-determining at least one available slot for the first uplink transmission comprises re-determining at least one available slot for transmitting data supposed to be transmitted in the cancelled corresponding part transmission of the first uplink transmission, or re-determining at least one available slot for transmitting data supposed to be transmitted in at least one slot corresponding to the cancelled corresponding part transmission of the first uplink transmission.

In an embodiment, the method further comprises, when the at least one time-overlapping slot is used for the first uplink transmission, determining at least a part of data transmission of the second uplink transmission is canceled.

In an embodiment, the method further comprises, when the at least one time-overlapping slot is used for the second uplink transmission, determining at least a part of data transmission of the first uplink transmission is canceled.

In an embodiment, determining at least a part of data transmission of the second uplink transmission is canceled comprises determining data transmission of the cancelled corresponding part transmission of the second uplink transmission is canceled, or determining data transmission of at least one slot corresponding to the cancelled corresponding part transmission of the second uplink transmission is canceled.

In an embodiment, determining at least a part of data transmission of the first uplink transmission is canceled comprises determining data transmission of the cancelled corresponding part transmission of the first uplink transmission is canceled, or determining data transmission of at least one slot corresponding to the cancelled corresponding part transmission of the first uplink transmission is canceled.

In an embodiment, collision handling between a triggered enhanced Type A PUSCH repetition transmission and a transmission of SPS HARQ-ACK or SRS is performed after a determination of available slots for counting the triggered enhanced Type A PUSCH repetition transmission.

In a third aspect of the disclosure, there is provided a terminal device. The terminal device comprises a processor and a memory coupled to the processor. Said memory contains instructions executable by said processor. Said terminal device is operative to obtain at least one first available slot for a first uplink transmission. Said terminal device is further operative to obtain at least one second available slot for a second uplink transmission. Said terminal device is further operative to determine that the at least one first available slot and the at least one second available slot overlap in time by at least one time-overlapping slot. Said terminal device is further operative to determine whether the at least one time-overlapping slot is used for the first uplink transmission or the second uplink transmission based on one or more collision handling rules. Said terminal device is further operative to transmit the first uplink transmission and/or the second uplink transmission to a network device.

In a fourth aspect of the disclosure, there is provided a network device. The network device comprises a processor and a memory coupled to the processor. Said memory contains instructions executable by said processor. Said network device is operative to determine at least one first available slot for a first uplink transmission. Said network device is further operative to determine at least one second available slot for a second uplink transmission. Said network device is further operative to determine that the at least one first available slot and the at least one second available slot overlap in time by at least one time-overlapping slot. Said network device is further operative to determine whether the at least one time-overlapping slot is used for the first uplink transmission or the second uplink transmission based on one or more collision handling rules. Said network device is further operative to receive the first uplink transmission and/or the second uplink transmission from a terminal device.

In a fifth aspect of the disclosure, there is provided is a terminal device. The terminal device comprises a first obtaining module, a second obtaining module, a first determining module, a second determining module and a transmitting module. The first obtaining module may be configured to obtain at least one first available slot for a first uplink transmission. The second obtaining module may be configured to obtain at least one second available slot for a second uplink transmission. The first determining module may be configured to determine that the at least one first available slot and the at least one second available slot overlap in time by at least one time-overlapping slot. The second determining module may be configured to determine whether the at least one time-overlapping slot is used for the first uplink transmission or the second uplink transmission based on one or more collision handling rules. The transmitting module may be configured to transmit the first uplink transmission and/or the second uplink transmission to a network device.

In an embodiment, the terminal device may further comprise a first re-obtaining module configured to re-obtain at least one available slot for the second uplink transmission when the at least one time-overlapping slot is used for the first uplink transmission and a corresponding part transmission of the second uplink transmission is cancelled.

In an embodiment, the terminal device may further comprise a second re-obtaining module configured to re-obtain at least one available slot for the first uplink transmission when the at least one time-overlapping slot is used for the second uplink transmission and a corresponding part transmission of the first uplink transmission is cancelled.

In an embodiment, the terminal device may further comprise a first canceling module configured to cancel at least a part of data transmission of the second uplink transmission when the at least one time-overlapping slot is used for the first uplink transmission.

In an embodiment, the terminal device may further comprise a second canceling module configured to cancel at least a part of data transmission of the first uplink transmission when the at least one time-overlapping slot is used for the second uplink transmission.

In a sixth aspect of the disclosure, there is provided a network device. The network device comprises a first determining module, a second determining module, a third determining module, a fourth determining module and a receiving module. The first determining module may be configured to determine at least one first available slot for a first uplink transmission. The second determining module may be configured to determine at least one second available slot for a second uplink transmission. The third determining module may be configured to determine that the at least one first available slot and the at least one second available slot overlap in time by at least one time-overlapping slot. The fourth determining module may be configured to determine whether the at least one time-overlapping slot is used for the first uplink transmission or the second uplink transmission based on one or more collision handling rules. The receiving module may be configured to receive the first uplink transmission and/or the second uplink transmission from a terminal device.

In an embodiment, the network device may further comprise a first re-determining module configured to re-determine at least one available slot for the second uplink transmission when the at least one time-overlapping slot is used for the first uplink transmission and a corresponding part transmission of the second uplink transmission is cancelled.

In an embodiment, the network device may further comprise a second re-determining module configured to re-determine at least one available slot for the first uplink transmission when the at least one time-overlapping slot is used for the second uplink transmission and a corresponding part transmission of the first uplink transmission is cancelled.

In an embodiment, the network device may further comprise a fifth determining module configured to determine at least a part of data transmission of the second uplink transmission is canceled when the at least one time-overlapping slot is used for the first uplink transmission.

In an embodiment, the network device may further comprise a sixth determining module configured to determine at least a part of data transmission of the first uplink transmission is canceled when the at least one time-overlapping slot is used for the second uplink transmission.

In another aspect of the disclosure, there is provided a computer program product comprising instructions. When the instructions is executed by at least one processor, the instructions cause the at least one processor to perform the method according to any one of the first and second aspects.

In another aspect of the disclosure, there is provided a computer-readable storage medium storing instructions, When the instructions is executed by at least one processor, the instructions cause the at least one processor to perform the method according to any one of the first and second aspects.

In another aspect of the disclosure, there is provided a communication system including a host computer. The host computer includes processing circuitry configured to provide user data and a communication interface configured to forward the user data to a cellular network for transmission to a terminal device. The cellular network includes the network device above mentioned and/or the terminal device above mentioned.

In embodiments of the present disclosure, the system further includes the terminal device, wherein the terminal device is configured to communicate with the network device.

In embodiments of the present disclosure, the processing circuitry of the host computer is configured to execute a host application, thereby providing the user data; and the terminal device includes processing circuitry configured to execute a client application associated with the host application.

In another aspect of the disclosure, there is provided a communication system including a host computer and a network device. The host computer includes a communication interface configured to receive user data originating from a transmission from a terminal device. The transmission is from the terminal device to the network device. The network device is above mentioned, and/or the terminal device is above mentioned.

In embodiments of the present disclosure, the processing circuitry of the host computer is configured to execute a host application. The terminal device is configured to execute a client application associated with the host application, thereby providing the user data to be received by the host computer.

In another aspect of the disclosure, there is provided a method implemented in a communication system which may include a host computer, a network device and a terminal device. The method may comprise providing user data at the host computer. Optionally, the method may comprise, at the host computer, initiating a transmission carrying the user data to the terminal device via a cellular network comprising the network device which may perform any step of the method according to the second aspect of the present disclosure.

In another aspect of the disclosure, there is provided a communication system including a host computer. The host computer may comprise processing circuitry configured to provide user data, and a communication interface configured to forward the user data to a cellular network for transmission to a terminal device. The cellular network may comprise a network device having a radio interface and processing circuitry. The network device's processing circuitry may be configured to perform any step of the method according to the second aspect of the present disclosure.

In another aspect of the disclosure, there is provided a method implemented in a communication system which may include a host computer, a network device and a terminal device. The method may comprise providing user data at the host computer. Optionally, the method may comprise, at the host computer, initiating a transmission carrying the user data to the terminal device via a cellular network comprising the network device. The terminal device may perform any step of the method according to the first aspect of the present disclosure.

In another aspect of the disclosure, there is provided a communication system including a host computer. The host computer may comprise processing circuitry configured to provide user data, and a communication interface configured to forward user data to a cellular network for transmission to a terminal device. The terminal device may comprise a radio interface and processing circuitry. The terminal device's processing circuitry may be configured to perform any step of the method according to the first aspect of the present disclosure.

In another aspect of the disclosure, there is provided a method implemented in a communication system which may include a host computer, a network device and a terminal device. The method may comprise, at the host computer, receiving user data transmitted to the network device from the terminal device which may perform any step of the method according to the first aspect of the present disclosure.

In another aspect of the disclosure, there is provided a communication system including a host computer. The host computer may comprise a communication interface configured to receive user data originating from a transmission from a terminal device to a network device. The terminal device may comprise a radio interface and processing circuitry. The terminal device's processing circuitry may be configured to perform any step of the method according to the first aspect of the present disclosure.

In another aspect of the disclosure, there is provided a method implemented in a communication system which may include a host computer, a network device and a terminal device. The method may comprise, at the host computer, receiving, from the network device, user data originating from a transmission which the network device has received from the terminal device. The network device may perform any step of the method according to the second aspect of the present disclosure.

In another aspect of the disclosure, there is provided a communication system which may include a host computer. The host computer may comprise a communication interface configured to receive user data originating from a transmission from a terminal device to a network device. The network device may comprise a radio interface and processing circuitry. The network device's processing circuitry may be configured to perform any step of the method according to the second aspect of the present disclosure.

Embodiments herein may provide many advantages, of which a non-exhaustive list of examples follows. In some embodiments herein, there is provided methods on when and how to determine available slot(s) for uplink transmission. In some embodiments herein, there is provided the rules on collision handling for uplink transmission (such as enhanced Type A PUSCH repetition transmission). In some embodiments herein, the proposed methods can ensure the robust uplink transmission (such as PUSCH repetition transmission via enabling the support the enhanced Type A PUSCH repetition). In some embodiments herein, the proposed methods can improve the resource utilization efficiency. The embodiments herein are not limited to the features and advantages mentioned above. A person skilled in the art will recognize additional features and advantages upon reading the following detailed description.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 2 shows a flowchart of a method according to an embodiment of the present disclosure;

FIG. 3 shows a flowchart of a method according to another embodiment of the present disclosure;

FIG. 4 shows a flowchart of a method according to another embodiment of the present disclosure;

FIG. 6a shows a flowchart of a method according to another embodiment of the present disclosure;

FIG. 6b shows a flowchart of a method according to another embodiment of the present disclosure;

FIG. 6c shows a flowchart of a method according to another embodiment of the present disclosure;

DETAILED DESCRIPTION

Figure 1:
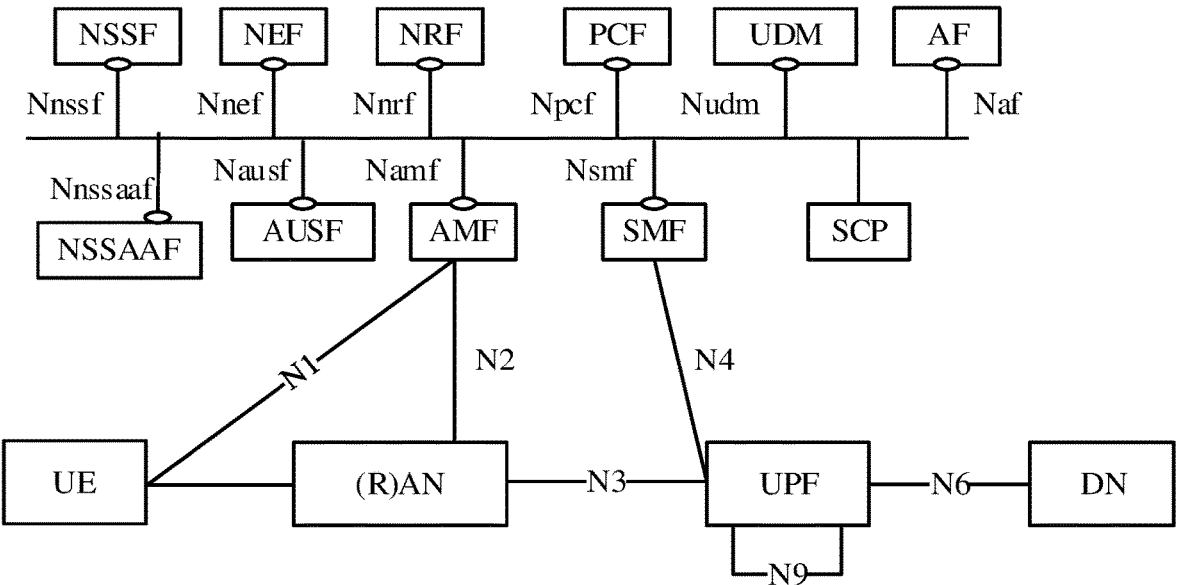
FIG. 1 schematically shows a high level architecture in the fifth generation network according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "determine" may be used herein to refer to actual calculation or generation of a result, value, parameter, etc., but an element/device may obtain the result, value, parameter, etc. from another element/device.

As used herein, the term "network" refers to a network following any suitable communication standards such as new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the communication protocols as defined by a standard organization such as 3GPP. For example, the communication protocols may comprise the first generation (1G), 2G, 3G, 4G, 4.5G, 5G communication protocols, and/or any other protocols either currently known or to be developed in the future.

The term "network device" refers to any suitable network function (NF) which can be implemented in a network entity (physical or virtual) of a communication network. For example, the network function can be implemented either as a network element on a dedicated hardware, as a software instance running on a dedicated hardware, or as a virtualized function instantiated on an appropriate platform, e.g. on a cloud infrastructure. For example, the 5G system (5GS) may comprise a plurality of NFs such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function) and NRF (Network Repository Function), RAN (radio access network), SCP (service communication proxy), NWDAF (network data analytics function), NSSF (Network Slice Selection Function), NSSAAF (Network Slice-Specific Authentication and Authorization Function), etc. In other embodiments, the network function may comprise different types of NFs for example depending on a specific network.

The network device may be an access network device with accessing function in a communication network via which a terminal device accesses to the network and receives services therefrom. The access network device may include a base station (BS), an access point (AP), a multicell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), an Integrated Access and Backhaul (IAB) node, a remote radio head (RRH), a relay, a low power node such as a femto, a pico, and so forth.

Yet further examples of the access network device comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VOIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP (3rd Generation Partnership Project), such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IOT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink (DL) transmission refers to a transmission from the network device to a terminal device, and an uplink (UL) transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and B" or "at least one of A or B" should be understood to mean "only A, only B, or both A and B." The phrase "A and/or B" should be understood to mean "only A, only B, or both A and B".

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

Although the subject matter described herein may be implemented in any appropriate type of system using any suitable components, the embodiments disclosed herein are described in relation to a communication system complied with the exemplary system architectures illustrated in FIG. 1. For simplicity, the system architectures of FIG. 1 only depict some exemplary elements. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

FIG. 1 schematically shows a high level architecture in the fifth generation network according to an embodiment of the present disclosure. For example, the fifth generation network may be 5GS. The architecture of FIG. 1 is same as FIG. 4.2.3-1 as described in 3GPP TS 23.501 V16.7.0, the disclosure of which is incorporated by reference herein in its entirety. The system architecture of FIG. 1 may comprise some exemplary elements such as AUSF, AMF, DN (data network), NEF, NRF, NSSF, PCF, SMF, UDM, UPF, AF, UE, (R)AN, SCP (Service Communication Proxy), NSSAAF (Network Slice-Specific Authentication and Authorization Function), etc.

In accordance with an exemplary embodiment, the UE can establish a signaling connection with the AMF over the reference point N1, as illustrated in FIG. 1. This signaling connection may enable NAS (Non-access stratum) signaling exchange between the UE and the core network, comprising a signaling connection between the UE and the (R)AN and the N2 connection for this UE between the (R)AN and the AMF. The (R)AN can communicate with the UPF over the reference point N3. The UE can establish a protocol data unit (PDU) session to the DN (data network, e.g. an operator network or Internet) through the UPF over the reference point N6.

As further illustrated in FIG. 1, the exemplary system architecture also contains the service-based interfaces such as Nnrf, Nnef, Nausf, Nudm, Npcf, Namf and Nsmf exhibited by NFs such as the NRF, the NEF, the AUSF, the UDM, the PCF, the AMF and the SMF. In addition, FIG. 1 also shows some reference points such as N1, N2, N3, N4, N6 and N9, which can support the interactions between NF services in the NFs. For example, these reference points may be realized through corresponding NF service-based interfaces and by specifying some NF service consumers and providers as well as their interactions in order to perform a particular system procedure.

Various NFs shown in FIG. 1 may be responsible for functions such as session management, mobility management, authentication, security, etc. The AUSF, AMF, DN, NEF, NRF, NSSF, PCF, SMF, UDM, UPF, AF, UE, (R)AN, SCP may include the functionality for example as defined in clause 6.2 of 3GPP TS23.501 V16.7.0.

PUSCH (Physical Uplink Shared Channel) Repetition

PUSCH repetition in 3GPP NR Release-15

Slot aggregation for PUSCH is supported in 3GPP NR Release-15 and renamed to PUSCH Repetition Type A in 3GPP NR Release-16. The name PUSCH repetition Type A is used even if there is only a single repetition, i.e. no slot aggregation. In 3GPP NR Release-15, a PUSCH transmission that overlaps with DL (downlink) symbols is not transmitted.

For DCI (Downlink Control Information) granted multi-slot transmission (PDSCH(Physical Downlink Shared Channel)/PUSCH) vs. semi-static DL/UL assignment:

If semi-static DL/UL (uplink) assignment configuration of a slot has no direction confliction with scheduled PDSCH/PUSCH assigned symbols, the PDSCH/PUSCH in that slot is received/transmitted, If semi-static DL/UL assignment configuration of a slot has direction confliction with scheduled PDSCH/PUSCH assigned symbols, the PDSCH/PUSCH transmission in that slot is not received/transmitted, i.e. the effective number of PUSCH repetitions reduces In 3GPP NR Release-15, the number of PUSCH repetitions is semi-statically configured by RRC (Radio Resource Control) parameter pusch-AggregationFactor. At most 8 PUSCH repetitions are supported.

pusch-AggregationFactor ENUMERATED {n2, n4, n8}

Early termination of PUSCH repetitions was discussed in 3GPP TSG RAN WG1 Meeting #88, R1-1703868, WF on grant-free repetitions, Huawei, HiSilicon, Nokia, ABS, ZTE, ZTE Microelectronics, CATT, Convida Wireless, CATR, OPPO, Inter Digital, Fujitsu, 13th-17th February 2017.

Agreements:

For UE configured with K repetitions for a TB (Transport Block) transmission with/without grant, the UE can continue repetitions (FFS (for future study) can be different RV (redundancy version) versions, FFS different MCS (Modulation and Coding Scheme)) for the TB until one of the following conditions is met If an UL grant is successfully received for a slot/mini-slot for the same TB FFS: How to determine the grant is for the same TB FFS: An acknowledgement/indication of successful receiving of that TB from gNB The number of repetitions for that TB reaches K FFS: Whether it is possible to determine if the grant is for the same TB Note that this does not assume that UL grant is scheduled based on the slot whereas grant free allocation is based on mini-slot (vice versa)

Note that other termination condition of repetition may apply.

PUSCH Repetition in 3GPP NR Release-16

A new repetition format PUSCH repetition Type B is supported in 3GPP NR Release-16, which PUSCH repetition allows back-to-back repetition of PUSCH transmissions. The biggest difference between the two PUSCH repetition types is that PUSCH repetition Type A only allows a single PUSCH repetition in each slot, with each PUSCH repetition occupying the same symbols. Using this format with a PUSCH length shorter than 14 introduces gaps between PUSCH repetitions, increasing the overall latency. The other change compared to 3GPP NR Release-15 is how the number of PUSCH repetitions is signaled. In 3GPP NR Release-15, the number of PUSCH repetitions is semi-statically configured, while in 3GPP NR Release-16 the number of PUSCH repetitions can be indicated dynamically in DCI. This applies both to dynamic grants and configured grants type 2.

In 3GPP NR Release-16, invalid symbols for PUSCH repetition Type B include reserved UL resources. The invalid symbol pattern indicator field is configured in the scheduling DCI. Segmentation occurs around symbols that are indicated as DL by the semi-static TDD pattern and invalid symbols.

Details about the signaling of the number of repetitions can be found in following paragraphs copied from 3GPP TS 38.214 V16.4.0, the disclosure of which is incorporated by reference herein in its entirety.

When the UE is scheduled to transmit a transport block and no CSI (Channel State Information) report, or the UE is scheduled to transmit a transport block and a CSI report(s) on PUSCH by a DCI, the 'Time domain resource assignment' field value m of the DCI provides a row index m+1 to an allocated table. The determination of the used resource allocation table is defined in Clause 6.1.2.1.1 of 3GPP TS 38.214 V16.4.0. The indexed row defines the slot offset $K_2$, the start and length indicator SLIV (Start and length indicator value), or directly the start symbol S and the allocation length L, the PUSCH mapping type, and the number of repetitions (if numberOfRepetitions is present in the resource allocation table) to be applied in the PUSCH transmission.

For PUSCH repetition Type A, when transmitting PUSCH scheduled by DCI format 0_1 or 0_2 in PDCCH with CRC (Cyclic Redundancy Check) scrambled with C-RNTI (Cell RNTI (Radio Network Temporary Identity)), MCS-C-RNTI (Modulation and Coding Scheme C-RNTI), or CS-RNTI (Configured Scheduling RNTI) with NDI=1, the number of repetitions K is determined as if numberOfRepetitions is present in the resource allocation table, the number of repetitions K is equal to numberOfRepetitions;
    else if the UE is configured with pusch-AggregationFactor, the number of repetitions K is equal to pusch-AggregationFactor;
    otherwise K=1.

For PUSCH repetition Type A (as determined according to procedures defined in Clause 6.1.2.1 of 3GPP TS 38.214 V16.4.0 for scheduled PUSCH, or Clause 6.1.2.3 of 3GPP TS 38.214 V16.4.0 for configured PUSCH), a UE is configured for frequency hopping by the higher layer parameter frequencyHoppingDCI-0-2 in pusch-Config for PUSCH transmission scheduled by DCI format 0_2, and by frequencyHopping provided in pusch-Config for PUSCH transmission scheduled by a DCI format other than 0_2, and by frequencyHopping provided in configuredGrantConfig for configured PUSCH transmission. One of two frequency hopping modes can be configured:

Intra-slot frequency hopping, applicable to single slot and multi-slot PUSCH transmission.
    Inter-slot frequency hopping, applicable to multi-slot PUSCH transmission.

In case of resource allocation type 2, the UE transmits PUSCH without frequency hopping.

In case of resource allocation type 1, whether or not transform precoding is enabled for PUSCH transmission, the UE may perform PUSCH frequency hopping, if the frequency hopping field in a corresponding detected DCI format or in a random access response UL grant is set to 1, or if for a Type 1 PUSCH transmission with a configured grant the higher layer parameter frequencyHoppingOffset is provided, otherwise no PUSCH frequency hopping is performed. When frequency hopping is enabled for PUSCH, the RE mapping is defined in clause 6.3.1.6 of 3GPP TS 38.211 V16.4.0, the disclosure of which is incorporated by reference herein in its entirety.

For a PUSCH scheduled by RAR UL grant, fallbackRAR UL grant, or by DCI format 0_0 with CRC scrambled by TC-RNTI (temporary C-RNTI), frequency offsets are obtained as described in clause 8.3 of 3GPP TS 38.213 V16.4.0, the disclosure of which is incorporated by reference herein in its entirety. For a PUSCH scheduled by DCI format 0_0/0_1 or a PUSCH based on a Type2 configured UL grant activated by DCI format 0_0/0_1 and for resource allocation type 1 offsets are configured by higher layer parameter frequencyHoppingOffsetLists in pusch-Config. For a PUSCH scheduled by DCI format 0_2 or a PUSCH based on a Type2 configured UL grant activated by DCI format 0_2 and for resource allocation type 1, frequency offsets are configured by higher layer parameter frequencyHoppingOffsetListsDCI-0-2 in pusch-Config.

When the size of the active BWP (bandwidth part) is less than 50 PRBs (Physical Resource Block), one of two higher layer configured offsets is indicated in the UL grant.
    When the size of the active BWP is equal to or greater than 50 PRBs, one of four higher layer configured offsets is indicated in the UL grant.

For PUSCH based on a Type1 configured UL grant the frequency offset is provided by the higher layer parameter frequencyHoppingOffset in rrc-ConfiguredUplinkGrant.

For a MsgA (message A) PUSCH the frequency offset is provided by the higher layer parameter as described in 3GPP TS 38.213 V16.4.0.

In case of intra-slot frequency hopping, the starting RB (Resource Block) in each hop is given by:

$$RB_{start} = \begin{cases} RB_{start} & i = 0 \\ (RB_{start} + RB_{offset}) \bmod N_{BWP}^{size} & i = 1 \end{cases},$$

Where i=0 and i=1 are the first hop and the second hop respectively, and $RB_{start}$ is the starting RB within the UL BWP, as calculated from the resource block assignment information of resource allocation type 1 (described in Clause 6.1.2.2.2 of 3GPP TS 38.214 V16.4.0) or as calculated from the resource assignment for MsgA PUSCH (described in 3GPP TS 38.213 V16.4.0) and $RB_{offset}$ is the frequency offset in RBs between the two frequency hops. The number of symbols in the first hop is given by $$\lfloor N_{symb}^{PUSCH,s} / 2 \rfloor,$$

the number of symbols in the second hop is given by $$N_{symb}^{PUSCH,s} - \lfloor N_{symb}^{PUSCH,s} / 2 \rfloor,$$

where $$N_{symb}^{PUSCH,s}$$

is the length of the PUSCH transmission in OFDM (Orthogonal Frequency Division Multiplex) symbols in one slot.

In case of inter-slot frequency hopping, the starting RB during slot $$n_s^{\mu}$$

is given by:

$$RB_{start}(n_s^{\mu}) = \begin{cases} RB_{start} & n_s^{\mu} \bmod 2 = 0 \\ (RB_{start} + RB_{offset}) \bmod N_{BWP}^{size} & n_s^{\mu} \bmod 2 = 1 \end{cases},$$

Where $$n_s^{\mu}$$

is the current slot number within a radio frame, where a multi-slot PUSCH transmission can take place, $RB_{start}$ is the starting RB within the UL BWP, as calculated from the resource block assignment information of resource allocation type 1 (described in Clause 6.1.2.2.2 of 3GPP TS 38.214 V16.4.0) and $RB_{offset}$ is the frequency offset in RBs between the two frequency hops.

As described in 3GPP TS 38.212 V16.4.0, the disclosure of which is incorporated by reference herein in its entirety, In Format 0_1

Time domain resource assignment—0, 1, 2, 3, 4, 5, or 6 bits

If the higher layer parameter pusch-TimeDomainAllocationListDCI-0-1 is not configured and if the higher layer parameter pusch-Time DomainAllocationListForMultiPUSCH is not configured and if the higher layer parameter pusch-TimeDomainAllocationList is configured, 0, 1, 2, 3, or 4 bits as defined in Clause 6.1.2.1 of 3GPP TS 38.214 V16.4.0. The bitwidth for this field is determined as $\lceil \log_2(I) \rceil$ bits, where I is the number of entries in the higher layer parameter pusch-TimeDomainAllocationList;

If the higher layer parameter pusch-TimeDomainAllocationListDCI-0-1 is configured or if the higher layer parameter pusch-TimeDomainAllocationListForMultiPUSCH is configured, 0, 1, 2, 3, 4, 5 or 6 bits as defined in Clause 6.1.2.1 of 3GPP TS 38.214 V16.4.0. The bitwidth for this field is determined as $\lceil \log_2(I) \rceil$ bits, where I is the number of entries in the higher layer parameter pusch-TimeDomainAllocationListDCI-0-1 or pusch-Time DomainAllocationListForMultiPUSCH;

otherwise the bitwidth for this field is determined as $\lceil \log_2(I) \rceil$ bits, where I is the number of entries in the default table.

In Format 0_2

Time domain resource assignment—0, 1, 2, 3, 4, 5 or 6 bits as defined in Clause 6.1.2.1 of 3GPP TS 38.214 V16.4.0. The bitwidth for this field is determined as $\lceil \log_2(I) \rceil$ bits, where I is the number of entries in the higher layer parameter pusch-TimeDomainAllocationListDCI-0-2 if the higher layer parameter is configured, or I is the number of entries in the higher layer parameter PUSCH-TimeDomainResourceAllocationList if the higher layer parameter PUSCH-TimeDomainResourceAllocationList is configured and the higher layer parameter pusch-TimeDomainAllocationListDCI-0-2 is not configured; otherwise I is the number of entries in the default table.

As described in 3GPP TS 38.331 V16.3.1, the disclosure of which is incorporated by reference herein in its entirety,

---

PUSCH-Config information element pusch-RepTypeIndicatorForDCI-Format0-2-r16                    ENUMERATED
{ pusch-RepTypeA, pusch-RepTypeB}        OPTIONAL,    -- Need R
pusch-RepTypeIndicatorForDCI-Format0-1-r16                    ENUMERATED {
pusch-RepTypeA, pusch-RepTypeB}          OPTIONAL,    -- Need R
pusch-TimeDomainAllocationList                SetupRelease {
PUSCH-TimeDomainResourceAllocationList }
pusch-AggregationFactor                  ENUMERATED { n2, n4, n8 }
OPTIONAL,    -- Need S
pusch-TimeDomainAllocationListForDCI-Format0-1-r16              SetupRelease
{ PUSCH-TimeDomainResourceAllocationList-r16 }
pusch-TimeDomainAllocationListForDCI-Format0-2-r16              SetupRelease
{ PUSCH-TimeDomainResourceAllocationList-r16 }

60

---

PUSCH-TimeDomainResourceAllocation information element

-- ASN1START

-continued

| PUSCH-TimeDomainResourceAllocation information element |
|---|
| -- TAG-PUSCH-TIMEDOMAINRESOURCEALLOCATIONLIST-START |
| PUSCH-TimeDomainResourceAllocationList ::= SEQUENCE |
| (SIZE(1..maxNrofUL-Allocations)) OF |
| PUSCH-TimeDomainResourceAllocation |
| PUSCH-TimeDomainResourceAllocation ::= SEQUENCE { |
|     k2                                          INTEGER (0..32) |
| OPTIONAL,   -- Need S |
|     mappingType                          ENUMERATED {typeA, typeB}, |
|     startSymbolAndLength                 INTEGER (0..127) |
| } |
| PUSCH-TimeDomainResourceAllocationList-r16 ::= SEQUENCE |
| (SIZE (1..maxNrofUL-Allocations-r16)) OF |
| PUSCH-TimeDomainResourceAllocation-r16 |
| PUSCH-TimeDomainResourceAllocation-r16 ::= SEQUENCE { |
|     k2-r16                               INTEGER (0..32) |
| OPTIONAL,   -- Need S |
|     puschAllocationList-r16                     SEQUENCE |
| (SIZE(1..maxNrofMultiplePUSCHs-r16)) OF PUSCH-Allocation-r16, |
|     ... |
| } |
| PUSCH-Allocation-r16 ::= SEQUENCE { |
|     mappingType-r16                      ENUMERATED {typeA, typeB} |
| OPTIONAL,   -- Cond NotFormat01-02-Or-TypeA |
|     startSymbolAndLength-r16             INTEGER (0..127) |
| OPTIONAL,   -- Cond NotFormat 01-02-Or-TypeA |
|     startSymbol-r16                      INTEGER (0..13) |
| OPTIONAL,   -- Cond RepTypeB |
|     length-r16                           INTEGER (1..14) |
| OPTIONAL,   -- Cond RepTypeB |
|     numberOfRepetitions-r16                     ENUMERATED {n1, n2, n3, |
| n4, n7, n8, n12, n16} OPTIONAL,      -- Cond Format01-02 |
|     ... |
| } |
| -- TAG-PUSCH-TIMEDOMAINRESOURCEALLOCATIONLIST-STOP |
| -- ASN1STOP |
| maxNrofUL-Allocations                   INTEGER ::= 16     -- Maximum |
| number of PUSCH time domain resource allocations. |
| maxNrofUL-Allocations-r16               INTEGER ::= 64     -- Maximum |
| number of PUSCH time |

Enhancements of PUSCH Repetition Type A in 3GPP NR Release-17

In 3GPP NR Release 15 and Release 16, a PUSCH repetition Type A on a set of symbols will be dropped if conflicting with TDD uplink downlink configuration or cancelled according to cancellation indication or intra-UE priority rules, leading to an actual number of repetitions less than configured number of PUSCH repetitions. It was agreed that in 3GPP NR Release 17 PUSCH repetition Type A can be based on available slots. It is still under discussion how UE determines availability of a slot that will be counted as one of the configured repetitions, which can be shown in the following related agreements and conclusion made in 3GPP RAN1 #104e meeting.

3GPP RAN1 #104e Agreements: Select one of the following alternatives, considering the aspect whether or not the determination of all the available slots should be done prior to the first actual transmission of the repetitions (other alternatives are not precluded), Alternative 1: Whether or not a slot is determined as available for UL transmissions depends on RRC configurations (at least tdd_ul_dl configuration, FFS: other RRC configurations) and does not depend on dynamic signaling (at least SFI (slot format indication), FFS: other dynamic signaling e.g. CI (Cancellation Indication), PUSCH priority for URLLC).

Alternative 2: Whether or not a slot is determined as available for UL transmissions depends on RRC configurations (at least tdd_ul_dl configuration, FFS: other RRC configurations) and also depends on dynamic signaling (at least SFI, FFS: other dynamic signaling e.g. CI, PUSCH priority for URLLC).

Conclusion

Discuss further to select one of the following alternatives:

Alternative-a: The determination of all the available slots has to be done prior to the first actual transmission of the repetitions.

Alternative-b: The determination of all the available slots does not have to be done prior to the first actual transmission of the repetitions. The timeline requirement is per repetition basis.

DL SPS PDSCH and its HARQ, i.e. SPS HARQ-ACK

DL SPS PDSCH is scheduled without corresponding PDCCH (Physical Downlink Control Channel) transmission using sps-Config and activated by DCI format 1_0, 1_1 or 1_2.

HARQ-ACK timing for DL SPS PDSCH

Upon detection of a DL SPS PDSCH in slot n, UE transmits HARQ-ACK in slot n+k when there is no contradicting semi-static configuration, where k is given by the PDSCH-to-HARQ-timing-indicator field carried in the activation DCI for the DL SPS process For the case of DL SPS PDSCH with dynamic SFI, the UE is not expected to have conflict between the HARQ-ACK feedback on link (DL or UL) direction between that of dynamic SFI and the A/N for SPS PDSCH in Rel-15

As described in 3GPP TS 38.213 v16.4.0, for a SPS PDSCH reception ending in slot n, the UE transmits the PUCCH in slot n+k where k is provided by the PDSCH-to-HARQ_feedback timing indicator field, if present, in a DCI format activating the SPS PDSCH reception.

If the UE detects a DCI format that does not include a PDSCH-to-HARQ_feedback timing indicator field and schedules a PDSCH reception or activates a SPS PDSCH reception ending in slot n, the UE provides corresponding HARQ-ACK information in a PUCCH transmission within slot n+k where k is provided by dl-DataToUL-ACK, or dl-DataToUL-ACK-r16, or dl-DataToUL-ACKForDCIFormat1_2.

SPS HARQ-ACK Deferral in 3GPP NR Release-17

As described in 3GPP TS38.213 v16.4.0, a PUCCH transmission with HARQ-ACK information is subject to the limitations for UE transmissions described in Clause 11.1 and Clause 11.1.1 of 3GPP TS38.213 v16.4.0.

It means in 3GPP NR Release 15 and release 16, SPS HARQ-ACK is dropped due to collision with semi-static TDD configuration. In 3GPP NR Release 17 IIOT and URLLC WI, it is being discussed how the SPS HARQ-ACK can be deferred to next available PUCCH.

3GPP RANI #102e Agreements: Support 3GPP NR Release 17 enhancements to avoid SPS HARQ-ACK dropping for TDD due to PUCCH collision with at least one DL or flexible symbol.

This topic is to be considered as high priority

FFS detailed solution(s)

3GPP RANI #103e Agreements: To address the issue of SPS HARQ-ACK dropping for TDD systems, focus on the following two options:

Option 1: Deferring HARQ-ACK until a next (e.g., first) available PUCCH.

FFS: Details including the definition of a next (e.g, first) available PUCCH, CB (codebook) construction (including potential Type-3 CB optimizations)/multiplexing.

Option 2: Dynamic triggering of a one-shot/Type-3 CB type of re-transmission.

FFS: Details on triggering and/or CB construction (include potential Type-3 CB optimizations)/multiplexing.

RAN1 #104e Agreements: Support deferring SPS HARQ-ACK dropped due to TDD specific collisions until a next available PUCCH in 3GPP NR Release-17 based on semi-static configuration of slot format.

FFS: Details (including possible conditions for such a deferring, whether or not to consider semi-statically configured flexible symbols for PUCCH availability, etc.)

Aim for minimal standardization efforts and UE complexity in implementation

Agreements: For SPS HARQ-ACK, the deferral from the initial slot/sub-slot determined by k1 in the activation DCI to the target slot/sub-slot determined by k1+k1$_{def}$, the UE will check the validity of a target slot/sub-slot evaluating from one slot/sub-slot to the next sub/sub-slot (i.e. in principle kl def granularity is 1 slot/sub-slot).

FFS: if there is a limit on the minimum deferral considered the required UE processing (K1$_{def}$≥0)

FFS: if there is a limit on the maximum deferral

Agreement: For SPS HARQ-ACK deferral, for the determination of valid symbols in the initial slot/sub-slot a collision with semi-static DL symbols, SSB and CORESET #0 is regarded as 'invalid' or 'no symbols for UL transmission'.

Intra-UE Prioritization

3GPP NR Release-16 supports a two-level PHY (physical) priority index indication of:

HARQ-ACK: PHY priority index may be indicated in DL DCI (Format 1_1 and 1_2) for dynamic assignments by the field "Priority indicator". For SPS, the PHY priority index is implicit from the PHY priority index of the HARQ-ACK codebook configured for SPS. PHY priority index may be indicated by RRC configuration.

PUSCH: For DG (Dynamic Grant), PHY priority index, may be indicated in UL DCI (Format 0_1 and 0_2) and for CG the PHY priority index may be indicated by CG configuration.

PHY priority index 0 is defined as low priority and PHY priority index 1 is defined as high priority. Low PHY priority is assumed for periodic and semi-persistent CSI (Channel State Information) on PUCCH, periodic, and semi-persistent and a-periodic SRS and when PHY priority is not indicated.

In 3GPP NR Release-16, UCI (Uplink Control Information) is multiplexed in a PUCCH or a PUSCH only if PHY priority index of UCI and the PHY priority index of PUCCH or PUSCH is the same. Different priority multiplexing is expected to be supported in 3GPP NR Release-17.

The 3GPP NR Release-16 intra-UE PHY prioritization first resolves time-overlapping for PUCCH and/or PUSCH transmissions for same low priority, then time-overlapping between priorities is resolved, where the lower-priority PUCCH/PUSCH is not transmitted if it is time-overlapping with a higher-priority PUCCH/PUSCH transmission.

SRS Configuration

Three types of SRS configuration are supported in NR:

Periodic SRS, RRC configured and activated

Per SRS resource configuration of periodicity and slot offset

Semi-persistent, RRC configured, MAC activated/deactivated

Per SRS resource configuration of periodicity, slot offset and SP SRS Activation/Deactivation MAC CE A-SRS, RRC configured, DCI activated with 2-bit SRS request field in DCI formats 1_1 and 0_1, or by Group common DCI Per SRS resource set configuration of slot offset w.r.t. DCI For an SRS resource configured as periodic or semi-persistent by the higher-layer parameter resourceType, a periodicity T$_{SRS}$ (in slots) and slot offset T$_{offset}$ are configured according to the higher-layer parameter periodicityAndOffset-p or periodicityAndOffset-sp.

SRS Collision with PUSCH in 3GPP NR Release-15/16/17

As described in 3GPP TS38.214 v15.11.0, when PUSCH and SRS are transmitted in the same slot, the UE may only be configured to transmit SRS after the transmission of the PUSCH and the corresponding DM-RS (demodulation reference signal).

In case of intra-band carrier aggregation or in inter-band CA band combination if simultaneous SRS and PUCCH/PUSCH transmissions are not supported by UE, the UE is not expected to be configured with SRS from a carrier and PUSCH/UL DM-RS/UL PT-RS(Phase-Tracking Reference Signal)/PUCCH formats from a different carrier in the same symbol.

As described in 3GPP TS 38.214 v16.4.0,

Intra-UE prioritization

If a PUSCH with a priority index 0 and SRS configured by SRS-Resource are transmitted in the same slot on a serving cell, the UE may only be configured to transmit SRS after the transmission of the PUSCH and the corresponding DM-RS.

If a PUSCH transmission with a priority index 1 or a PUCCH transmission with a priority index 1 would overlap in time with an SRS transmission on a serving cell, the UE does not transmit the SRS in the overlapping symbol(s).

SRS for positioning

For operation on the same carrier, if an SRS configured by the higher parameter SRS-PosResource collides with a scheduled PUSCH, the SRS is dropped in the symbols where the collision occurs.

One issue about SRS in 3GPP NR Release-15/16 is that SRS is dropped due to collision with other UL transmission, for example PUSCH. SRS enhancement was agreed in 3GPP NR Release-17 FeMIMO to address the issue. It was agreed to postpone the SRS to an available slot.

3GPP RAN1 #102e, 103e Agreement: a given aperiodic SRS resource set is transmitted in the (t+1)-th available slot counting from a reference slot, where t is indicated from DCI, or RRC (if only one value of t is configured in RRC), and the candidate values of t at least include 0. Adopt at least one of the following options for the reference slot.

An "available slot" is a slot satisfying there are UL or flexible symbol(s) for the time-domain location(s) for all the SRS resources in the resource set and it satisfies UE capability on the minimum timing requirement between triggering PDCCH and all the SRS resources in the resource set.

From the first symbol carrying the SRS request DCI and the last symbol of the triggered SRS resource set, UE does not expect to receive SFI indication, UL cancellation indication or dynamic scheduling of DL channel/signal(s) on flexible symbol(s) that may change the determination of "available slot".

Note: Collision handling between the triggered SRS and any other UL channel/signal is performed after the determination of available slot.

FFS: Rules to handle the case of multiple SRS resource sets with overlapping symbols and/or triggered by a same DCI 3GPP RAN1 #104e Agreement: For 3GPP NR Release-17 SRS capacity and coverage enhancement, support the following:

Increase the maximum number of repetition symbols in one slot and one SRS resource to S Support at least one S value from {8, 10, 12, 14}

FFS other candidate values

FIG. 2 shows a flowchart of a method according to an embodiment of the present disclosure, which may be performed by an apparatus implemented in or at or as a terminal device or communicatively coupled to the terminal device. As such, the apparatus may provide means or modules for accomplishing various parts of the method 200 as well as means or modules for accomplishing other processes in conjunction with other components.

At block 202, the terminal device may obtain at least one first available slot for a first uplink transmission. The first uplink transmission may be scheduled by a network device. The first uplink transmission may be used for various uplink signal or channel transmission. In an embodiment, the first uplink transmission may be used for transmission of uplink signal or channel based on available slots. For example, the first uplink transmission may be used for PUSCH Repetition Type A, or SPS HARQ-ACK, or SRS.

A slot may have a slot length. There may be any suitable number of symbols within a slot. The slot length may get different for example depending on numerology. For example, the slot length gets shorter as subcarrier spacing gets wider. In an embodiment, the slot may be same as the slot defined in various 3GPP specifications. For example, the slot may be the slot defined for LTE or NR.

For example, an available slot may refer to a slot that has not been occupied or used for signal or channel transmission or can satisfy uplink transmission of signal or channel. For example, an available slot is a slot satisfying there are UL or flexible symbol(s) for the time-domain location(s) for all the SRS resources in the resource set and it satisfies UE capability on the minimum timing requirement between triggering PDCCH and all the SRS resources in the resource set. In an embodiment, the available slot may be of the same meanings as described in various 3GPP specifications or drafts.

Each type of uplink transmission may require any suitable number of slot(s). The terminal device may determine or obtain the at least one first available slot for the first uplink transmission. For example, when the first uplink transmission requires n slot(s), the terminal device may determine or obtain n available slot(s) for the first uplink transmission, where n is an integer larger or equal to 1.

In an embodiment, the terminal device may actively determine the at least one first available slot for the first uplink transmission by itself. Alternatively the at least one first available slot for the first uplink transmission may be assigned or informed by a network device such as gNB. In this case, the terminal device may just use the at least one first available slot assigned or informed by the network device such as gNB.

In an embodiment, whether or not a slot is determined as available for UL transmissions depends on RRC configurations (at least tdd_ul_dl configuration and/or other RRC configurations) and does not depend on dynamic signaling (at least SFI, or other dynamic signaling e.g. CI, PUSCH priority for URLLC).

In an embodiment, whether or not a slot is determined as available for UL transmissions depends on RRC configurations (at least tdd_ul_dl configuration and/or other RRC configurations) and also depends on dynamic signaling (at least SFI and/or other dynamic signaling e.g. CI, PUSCH priority for URLLC).

In an embodiment, the determination of all the available slots has to be done prior to the first actual transmission of an uplink signal or channel (such as the PUSCH repetitions).

In an embodiment, the determination of all the available slots does not have to be done prior to the first actual transmission of an uplink signal or channel (such as the PUSCH repetitions). The timeline requirement is per repetition basis.

In an embodiment, upon detection of a DL SPS PDSCH in slot n, UE may determine slot n+k as the available slot for HARQ-ACK when there is no contradicting semi-static configuration, where k is given by the PDSCH-to-HARQ-timing-indicator field carried in the activation DCI for the DL SPS process.

At block 204, the terminal device may obtain at least one second available slot for a second uplink transmission. The second uplink transmission may be scheduled by a network device The obtaining operation of block 204 is similar to that of block 202. For some parts which have been described in the above embodiments, the description thereof is omitted here for brevity.

The second uplink transmission may be used for various uplink signal or channel transmission. In an embodiment, the second uplink transmission may be used for transmission of uplink signal or channel based on available slots. For example, the second uplink transmission may be used for uplink transmission for PUSCH Repetition Type A, or uplink transmission for SPS HARQ-ACK, or uplink transmission for SRS.

Each type of uplink transmission may require any suitable number of slot(s). The terminal device may determine or obtain the at least one second available slot for the second uplink transmission. For example, when the second uplink transmission requires m slot(s), the terminal device may determine or obtain m available slot(s) for the first uplink transmission, where m is an integer larger or equal to 1.

In an embodiment, the terminal device may actively determine the at least one second available slot for the second uplink transmission by itself. Alternatively the at least one second available slot for the second uplink transmission may be assigned or informed by a network device such as gNB. In this case, the terminal device may just use the at least one second available slot assigned or informed by the network device such as gNB.

At block 206, the terminal device may determine that the at least one first available slot and the at least one second available slot overlap in time by at least one time-overlapping slot. For a time-overlapping slot, at least one symbol in a slot is determined by both the first uplink transmission and the second uplink transmission as available symbol. The at least one time-overlapping slot may occur in at least one slot.

At block 208, the terminal device may determine whether the at least one time-overlapping slot is used for the first uplink transmission or the second uplink transmission based on one or more collision handling rules.

In an embodiment, at least one of the one or more collision handling rules is configured by the network device.

In an embodiment, the at least one of the one or more collision handling rules is configured in at least one of a non-physical layer signaling or a physical layer signaling.

In an embodiment, the physical layer signaling comprises downlink control information (DCI).

In an embodiment, at least one of the one or more collision handling rules is predetermined.

In an embodiment, the one or more collision handling rules are determined based on at least one of a time order of scheduling signaling for uplink transmission, a pre-determined priority of uplink transmission, a pre-configured priority of uplink transmission, or a type of scheduling signaling for uplink transmission.

In an embodiment, an earlier scheduled uplink transmission has a higher priority to use the at least one time-overlapping slot than a later scheduled uplink transmission.

In an embodiment, when an uplink transmission is scheduled by a radio resource control (RRC) signaling, a timing of the RRC signaling is determined as an end of a last symbol of physical downlink shared channel (PDSCH) which carries the RRC signaling.

In an embodiment, when an uplink transmission is scheduled by a DCI, a timing of the DCI is determined as an end of a last symbol of PDCCH carrying the DCI.

In an embodiment, semi-persistent scheduling (SPS) hybrid automatic repeat request (HARQ)-acknowledgement (ACK) transmission has a higher priority to use the at least one time-overlapping slot than physical uplink shared channel (PUSCH) transmission.

In an embodiment, PUSCH transmission has a higher priority to use the at least one time-overlapping slot than sounding reference signal (SRS) transmission.

In an embodiment, physical layer signaling scheduled uplink transmission has a higher priority to use the at least one time-overlapping slot than non-physical layer scheduled uplink transmission.

In an embodiment, a higher priority an uplink transmission has, a higher priority the uplink transmission has to use the at least one time-overlapping slot.

In an embodiment, when a terminal device such as UE is scheduled with multiple time-overlapping transmissions of UL physical channel/signal, which are based on the available slots, the terminal device such as UE can be configured by a high layer signaling or DCI or predetermine one or more of below methods to determine which UL physical channel/signal is prioritized and transmitted in a slot.

In an embodiment, the one or more collision handling rules may be determined based on time order of scheduling signaling. For example, the UL physical channel/signal which is scheduled earlier either by DCI or high layer signaling has a higher priority to be transmitted in a slot. For example, if a channel/signal is scheduled by RRC signaling, e.g. repetition of Type 1 CG-PUSCH, the terminal device such as UE determines its timing as the end of the last symbol of PDSCH which carries the RRC signaling. If the channel/signal is scheduled by DCI, the terminal device such as UE determines its timing as the end of the last symbol of PDCCH carrying the DCI.

In an embodiment, the one or more collision handling rules may be determined based on a pre-determined/configured priority according to content of UL transmission. For example, SPS HARQ-ACK transmission has a higher priority than PUSCH transmission. PUSCH transmission has a higher priority than SRS transmission.

In an embodiment, the one or more collision handling rules may be determined based on a type of the scheduling signaling. For example, L1 (layer 1 or physical layer) scheduled transmission has higher priority than the high layer scheduled transmission.

At block 210, the terminal device may transmit the first uplink transmission and/or the second uplink transmission to a network device. For example, when the at least one time-overlapping slot is used for the first uplink transmission, the terminal device may transmit whole first uplink transmission. When the at least one time-overlapping slot is used for the second uplink transmission, the terminal device may transmit whole second uplink transmission. A cancelled part transmission of uplink transmission may not be transmitted to the network device. Alternatively, when at least one part transmission of the uplink transmission is cancelled, the terminal device may re-obtain or re-determine at least one available slot for the uplink transmission. In this case, the terminal device may transmit whole uplink transmission.

Taking one slot for an example, when the at least one time-overlapping slot occupy one or more symbols within the slot and is used for the first uplink transmission, the corresponding one or more symbols transmission of the second uplink transmission is canceled, or the whole second uplink transmission is cancelled, or data transmission of the slot corresponding to the cancelled corresponding one or more symbols transmission of the second uplink transmission is cancelled. Similarly, when the at least one time-overlapping slot is used for the second uplink transmission, a corresponding part transmission of the first uplink transmission is cancelled, or the whole first uplink transmission is cancelled, or data transmission of the slot corresponding to the cancelled corresponding one or more symbols transmission of the second uplink transmission is cancelled.

FIG. 3 shows a flowchart of a method according to another embodiment of the present disclosure, which may be performed by an apparatus implemented in or at or as a terminal device or communicatively coupled to the terminal device. As such, the apparatus may provide means or modules for accomplishing various parts of the method 300 as well as means or modules for accomplishing other processes in conjunction with other components. For some parts which have been described in the above embodiments, the description thereof is omitted here for brevity.

At block 302, when the at least one time-overlapping slot is used for the first uplink transmission and a corresponding part transmission of the second uplink transmission is cancelled, the terminal device may re-obtain at least one available slot for the second uplink transmission. For example, the corresponding part transmission of the second uplink transmission may not be determined as available for the second uplink transmission and the terminal device may re-obtain at least one available slot for the second uplink transmission.

In an embodiment, the terminal device may re-obtain at least one available slot for transmitting data supposed to be transmitted in the cancelled corresponding part transmission of the second uplink transmission. The other available slot(s) for the second uplink transmission may be same as the corresponding slot(s) obtained in block 204 of FIG. 2.

In an embodiment, the terminal device may re-obtain at least one available slot for transmitting data supposed to be transmitted in at least one slot corresponding to the cancelled corresponding part transmission of the second uplink transmission. The other available slot(s) for the second uplink transmission may be same as the corresponding slot(s) obtained in block 204 of FIG. 2.

At block 304, when the at least one time-overlapping slot is used for the second uplink transmission and a corresponding part transmission of the first uplink transmission is cancelled, the terminal device may re-obtain at least one available slot for the first uplink transmission. For example, the corresponding part transmission of the first uplink transmission may not be determined as available for the first uplink transmission and the terminal device may re-obtain at least one available slot for the first uplink transmission.

In an embodiment, the terminal device may re-obtain at least one available slot for transmitting data supposed to be transmitted in the cancelled corresponding part transmission of the first uplink transmission. The other available slot(s) for the first uplink transmission may be same as the corresponding slot(s) obtained in block 202 of FIG. 2.

In an embodiment, the terminal device may re-obtain at least one available slot for transmitting data supposed to be transmitted in at least one slot corresponding to the cancelled corresponding part transmission of the first uplink transmission. The other available slot(s) for the first uplink transmission may be same as the corresponding slot(s) obtained in block 202 of FIG. 2.

FIG. 4 shows a flowchart of a method according to another embodiment of the present disclosure, which may be performed by an apparatus implemented in or at or as a terminal device or communicatively coupled to the terminal device. As such, the apparatus may provide means or modules for accomplishing various parts of the method 400 as well as means or modules for accomplishing other processes in conjunction with other components. For some parts which have been described in the above embodiments, the description thereof is omitted here for brevity.

At block 402, when the at least one time-overlapping slot is used for the first uplink transmission, the terminal device may cancel at least a part of data transmission of the second uplink transmission.

In an embodiment, the terminal device may cancel data transmission of the cancelled corresponding part transmission of the second uplink transmission. The other part of the second uplink transmission may still be transmitted.

In an embodiment, the terminal device may cancel data transmission of at least one slot corresponding to the cancelled corresponding part transmission of the second uplink transmission. The other part of the second uplink transmission may still be transmitted.

In an embodiment, the terminal device may cancel whole second uplink transmission.

At block 404, when the at least one time-overlapping slot is used for the second uplink transmission, the terminal device may cancel at least a part of data transmission of the first uplink transmission.

In an embodiment, the terminal device may cancel data transmission of the cancelled corresponding part transmission of the first uplink transmission. The other part of the first uplink transmission may still be transmitted.

In an embodiment, the terminal device may cancel data transmission of at least one slot corresponding to the cancelled corresponding part transmission of the first uplink transmission. The other part of the first uplink transmission may still be transmitted.

In an embodiment, the terminal device may cancel whole first uplink transmission.

In an embodiment, collision handling between the triggered enhanced Type A PUSCH repetition transmission and transmission of any other UL channel/signal can be performed in one or more of below ways. The enhanced Type A PUSCH repetition is a PUSCH repetition with repetition factor counted based only on available slot, and the other UL channel/signal can be SPS HARQ-ACK on PUCCH, or SRS from the same terminal device such as UE.

Option 1: Collision handling between the triggered enhanced Type A PUSCH repetition transmission and transmission of any other UL channel/signal is performed after the determination of available slots for counting the repetitions.

Option 2: Collision handling between the triggered enhanced Type A PUSCH repetition transmission and transmission of any other UL channel/signal is performed before the final determination of available slots for counting the repetitions.

In an example, with Option 1, UE determines available slots for enhanced Type A PUSCH repetition only once and then handles possible collision. If collision handling results in that a PUSCH repetition is to be cancelled, UE doesn't postpone it.

In another example, with Option 2, it allows UE to re-determine another available slot for the cancelled repetition prior to transmission. Option 2 with re-determination can have more transmitted repetitions than Option 1 with only one determination when some of the repetitions are cancelled due to priority handling.

Figure 5:
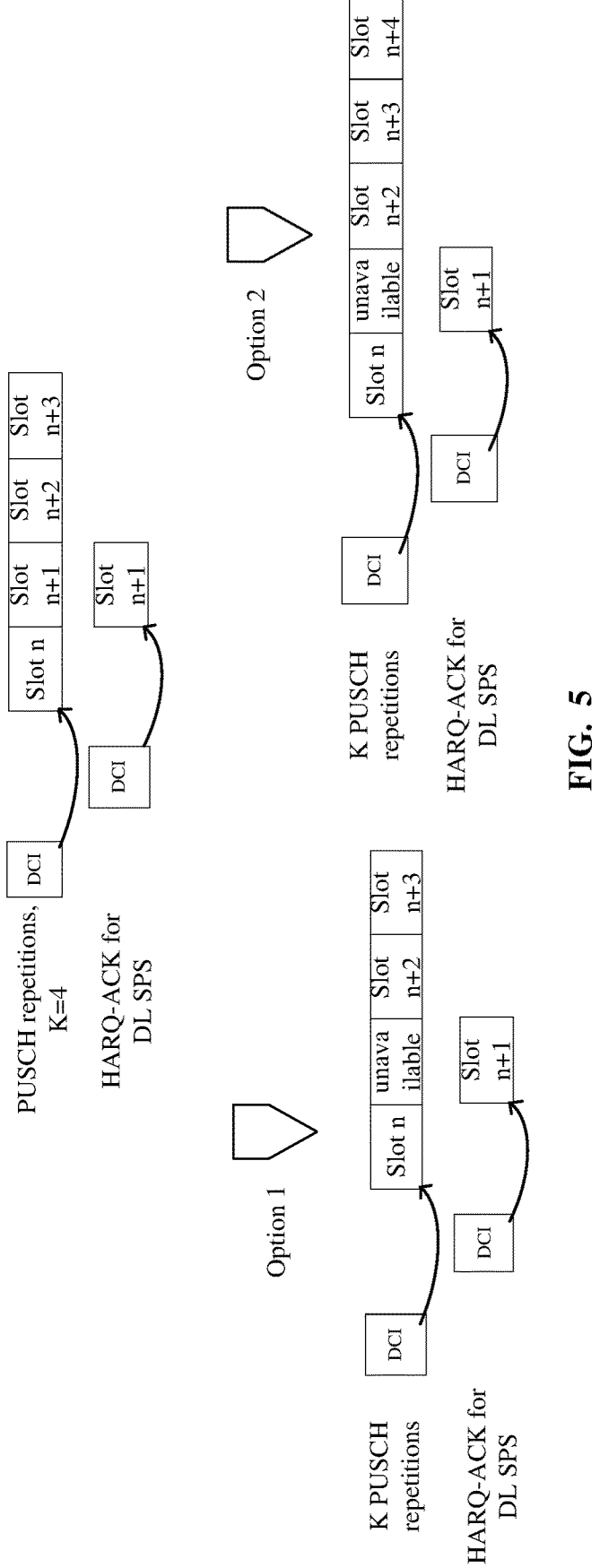
FIG. 5 shows an example of timing relation between determination of available slots and collision handling according to an embodiment of the present disclosure.

FIG. 5 shows an example of timing relation between determination of available slots and collision handling according to an embodiment of the present disclosure. As illustrated in FIG. 5, at first UE receives DCI for PUSCH repetitions with K=4 and determines slots from slot n to slot n+3 are available slots for PUSCH transmission. Before the start of PUSCH transmission in slot n, UE receives another grant for HARQ-ACK for DL SPS scheduled in slot n+1. With Option 1, UE handles the collision in slot n+1. If HARQ has higher priority, UE sends HARQ-ACK in slot n+1 and PUSCH repetition in slot n+1 is cancelled. With Option 2, UE determines slot n+4 as available slots to make up for slot n+1.

In an embodiment, a cancelled part transmission of uplink transmission is not counted for redundancy version pattern determination for the uplink transmission.

In an embodiment, the cancelled part transmission of uplink transmission is counted for redundancy version pattern determination for the uplink transmission.

For example, the redundancy version (RV) for enhanced Type A PUSCH repetition is determined based on one or more of the following methods.

The RV pattern for enhanced Type A PUSCH repetition is only determined by the resources scheduled by the UL grant for a number of enhanced PUSCH type A repetitions. The repetition cancelled due to collision handling (such as priority handling) will be counted for the RV pattern determination. For example, in FIG. 5, for option 2, the 5 slots can be determined with a RV sequence {0, 2, 3, 1, 0} when an RV pattern of {0, 2, 3, 1} is used for each 4 consecutive PUSCH repetitions.

The repetition cancelled due to priority handling will not be counted for the RV pattern determination for enhanced Type A PUSCH repetition. For example, in FIG. 5, for option 2, the 5 slots can be determined with a RV sequence {0, x, 2, 3, 1} when an RV pattern of {0, 2, 3, 1} is used for each 4 consecutive repetitions, where "x" denotes that the 2nd slot (slot "n+1") is not used for RV determination.

According to various embodiments, the proposed methods deal with how to handle the collision among multiple UL transmissions based on available slot.

In an embodiment, in 3GPP NR Release-17, resources for SPS HARQ-ACK, SRS and PUSCH repetition Type A can be based on available slots. UE starts to determine available slot(s) for a transmission when it is scheduled by DCI command or high layer configuration. Since there is a gap between the end of scheduling command and the start of UL transmission, e.g. K2 in PUSCH transmission, it is possible that during the gap UE receives an UL grant for another transmission. This is one case that UE is scheduled with multiple transmissions of UL physical channel/signal. Before the transmission of UL physical channel/signal, upon receiving a new UL grant, UE can keep or re-determine available slot(s) for the previously scheduled transmission as described above. Collision handling rule is mentioned above.

SPS HARQ-ACK can be multiplexed to time-overlapping PUSCH if they are of the same physical priority index and timeline check passes. According to 3GPP NR Release-16, if PUCCH and PUSCH have different physical priorities, they are handled separately.

In an embodiment, uplink transmission based on available slots comprises at least one of uplink transmission for PUSCH Repetition Type A, uplink transmission for SPS HARQ-ACK, or uplink transmission for SRS. For example, the uplink signal can be one or more of the following Type A PUSCH repetition which is a PUSCH repetition with repetition factor counted based only on available slot, SPS HARQ-ACK on PUCCH, or SRS.

FIG. 6 a shows a flowchart of a method according to another embodiment of the present disclosure, which may be performed by an apparatus implemented in or at or as a network device or communicatively coupled to the network device. As such, the apparatus may provide means or modules for accomplishing various parts of the method 600 as well as means or modules for accomplishing other processes in conjunction with other components. For some parts which have been described in the above embodiments, the description thereof is omitted here for brevity.

At block 602, the network device may determine at least one first available slot for a first uplink transmission. The determination operation of block 602 may be similar to determination operation of block 202 of FIG. 2.

At block 604, the network device may determine at least one second available slot for a second uplink transmission. The determination operation of block 604 may be similar to determination operation of block 204 of FIG. 2.

At block 606, the network device may determine that the at least one first available slot and the at least one second available slot overlap in time by at least one time-overlapping slot The determination operation of block 606 may be similar to determination operation of block 206 of FIG. 2.

At block 608, the network device may determine whether the at least one time-overlapping slot is used for the first uplink transmission or the second uplink transmission based on one or more collision handling rules. The determination operation of block 608 may be similar to determination operation of block 208 of FIG. 2.

At block 610, the network device may receive the first uplink transmission and/or the second uplink transmission from a terminal device. For example, the terminal device may transmit the first uplink transmission and/or the second uplink transmission to the network device at block 210 of FIG. 2, and then the network device may receive the first uplink transmission and/or the second uplink transmission from the terminal device.

FIG. 6b shows a flowchart of a method according to another embodiment of the present disclosure, which may be performed by an apparatus implemented in or at or as a network device or communicatively coupled to the network device. As such, the apparatus may provide means or modules for accomplishing various parts of the method 620 as well as means or modules for accomplishing other processes in conjunction with other components. For some parts which have been described in the above embodiments, the description thereof is omitted here for brevity.

At block 622, when the at least one time-overlapping slot is used for the first uplink transmission and a corresponding part transmission of the second uplink transmission is cancelled, the network device may re-determine at least one available slot for the second uplink transmission.

At block 624, the at least one time-overlapping slot is used for the second uplink transmission and a corresponding part transmission of the first uplink transmission is cancelled, the network device may re-determine at least one available slot for the first uplink transmission In an embodiment, the network device may re-determine at least one available slot for transmitting data to be transmitted in the cancelled corresponding part transmission of the second uplink transmission.

In an embodiment, the network device may re-determine at least one available slot for transmitting data to be transmitted in at least one slot corresponding to the cancelled corresponding part transmission of the second uplink transmission.

In an embodiment, the network device may re-determine at least one available slot for transmitting data supposed to be transmitted in the cancelled corresponding part transmission of the first uplink transmission.

In an embodiment, the network device may re-determine at least one available slot for transmitting data supposed to be transmitted in at least one slot corresponding to the cancelled corresponding part transmission of the first uplink transmission.

FIG. 6c shows a flowchart of a method according to another embodiment of the present disclosure, which may be performed by an apparatus implemented in or at or as a network device or communicatively coupled to the network device. As such, the apparatus may provide means or modules for accomplishing various parts of the method 630 as well as means or modules for accomplishing other processes in conjunction with other components. For some parts which have been described in the above embodiments, the description thereof is omitted here for brevity.

At block 632, when the at least one time-overlapping slot is used for the first uplink transmission, the network device may determine at least a part of data transmission of the second uplink transmission is canceled.

At block 634, when the at least one time-overlapping slot is used for the second uplink transmission, the network device may determine at least a part of data transmission of the first uplink transmission is canceled.

In an embodiment, the network device may determine data transmission of the cancelled corresponding part transmission of the second uplink transmission is canceled.

In an embodiment, the network device may determine data transmission of at least one slot corresponding to the cancelled corresponding part transmission of the second uplink transmission is canceled.

In an embodiment, the network device may determine data transmission of the cancelled corresponding part transmission of the first uplink transmission is canceled.

In an embodiment, the network device may determine data transmission of at least one slot corresponding to the cancelled corresponding part transmission of the first uplink transmission is canceled.

According to various embodiments, there is provided a solution for handling collision among SPS HARQ-ACK, SRS and PUSCH repetition Type A, all of which can be based on available slots, including methods for UE to determine available slots for the multiple UL transmissions with respect to when to do the collision handling. Some embodiments also provide rules for the collision handling.

Embodiments herein may provide many advantages, of which a non-exhaustive list of examples follows. In some embodiments herein, there is provided methods on when and how to determine available slot(s) for uplink transmission. In some embodiments herein, there is provided the rules on collision handling for uplink transmission (such as enhanced Type A PUSCH repetition transmission). In some embodiments herein, the proposed methods can ensure the robust uplink transmission (such as PUSCH repetition transmission via enabling the support the enhanced Type A PUSCH repetition). In some embodiments herein, the proposed methods can improve the resource utilization efficiency. The embodiments herein are not limited to the features and advantages mentioned above. A person skilled in the art will recognize additional features and advantages upon reading the following detailed description.

Figure 7:
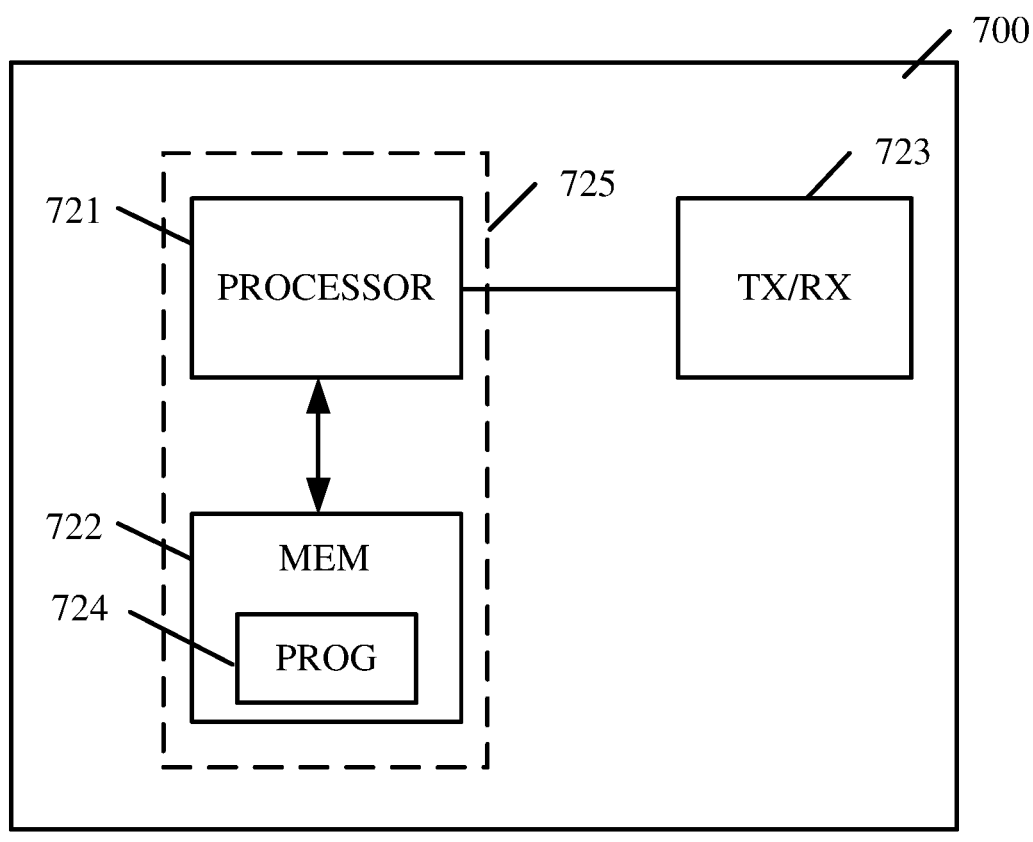
FIG. 7 is a block diagram showing an apparatus suitable for practicing some embodiments of the disclosure.

FIG. 7 is a block diagram showing an apparatus suitable for practicing some embodiments of the disclosure. For example, any one of the terminal device and the network device described above may be implemented as or through the apparatus 700.

The apparatus 700 comprises at least one processor 721, such as a digital processor (DP), and at least one memory (MEM) 722 coupled to the processor 721. The apparatus 700 may further comprise a transmitter TX and receiver RX 723 coupled to the processor 721. The MEM 722 stores a program (PROG) 724. The PROG 724 may include instructions that, when executed on the associated processor 721, enable the apparatus 700 to operate in accordance with the embodiments of the present disclosure. A combination of the at least one processor 721 and the at least one MEM 722 may form processing means 725 adapted to implement various embodiments of the present disclosure.

Various embodiments of the present disclosure may be implemented by computer program executable by one or more of the processor 721, software, firmware, hardware or in a combination thereof.

The MEM 722 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 721 may be of any type suitable to the local technical environment, and may include one or more of general purpose computers, special purpose computers, microprocessors, digital signal processors (DSPs) and processors based on multicore processor architecture, as non-limiting examples.

In an embodiment where the apparatus is implemented as or at the terminal device. The memory 722 contains instructions executable by the processor 721. The terminal device operates according to any of the methods related to the terminal device as described above.

In an embodiment where the apparatus is implemented as or at the network device. The memory 722 contains instructions executable by the processor 721. The network device operates according to any of the methods related to the network device as described above.

Figure 8A:
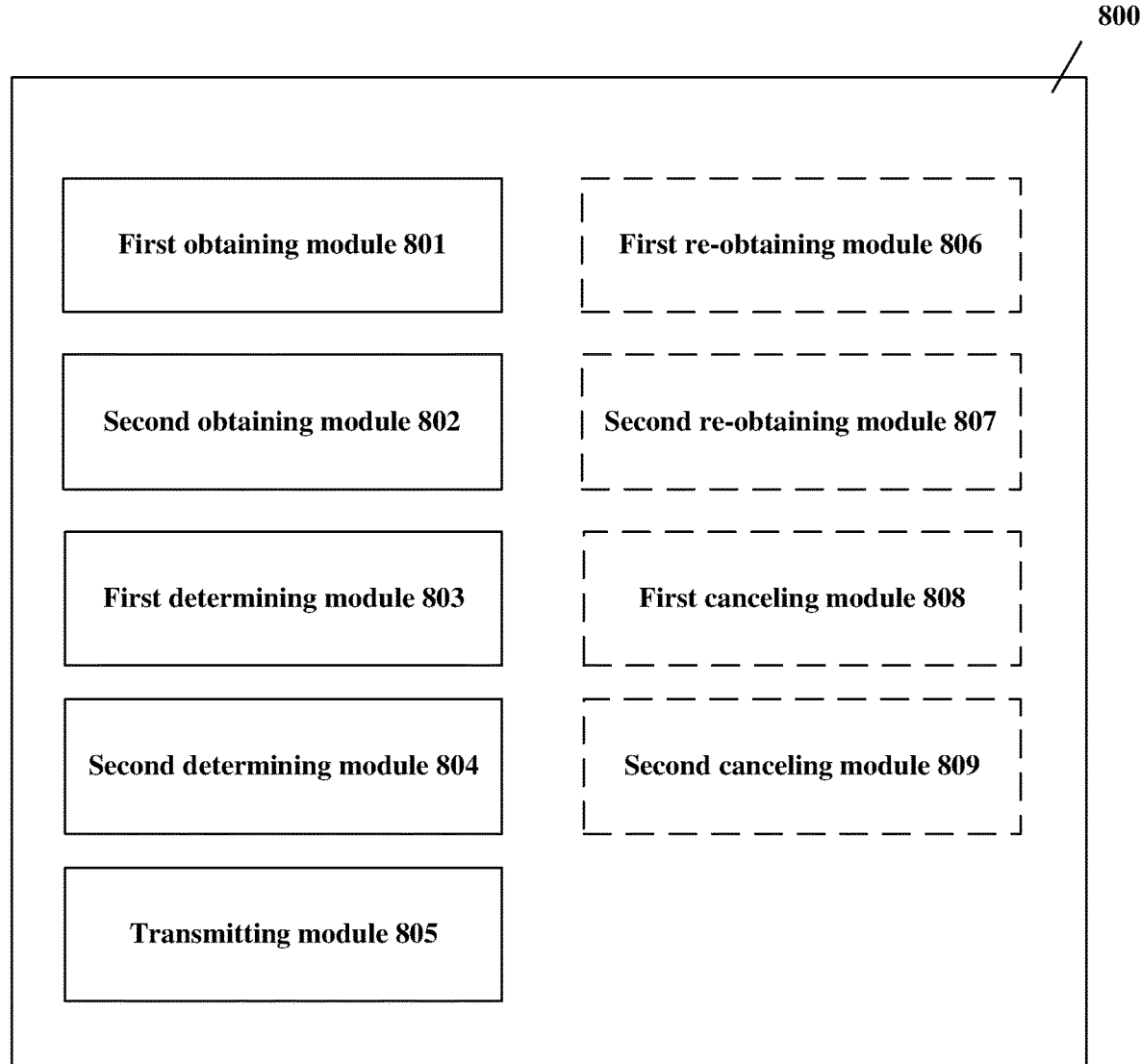
FIG. 8a is a block diagram showing a terminal device according to an embodiment of the disclosure.

FIG. 8 a is a block diagram showing a terminal device according to an embodiment of the disclosure. As shown, the terminal device 800 comprises a first obtaining module 801, a second obtaining module 802, a first determining module 803, a second determining module 804 and a transmitting module 805. The first obtaining module 801 may be configured to obtain at least one first available slot for a first uplink transmission. The second obtaining module 802 may be configured to obtain at least one second available slot for a second uplink transmission. The first determining module 803 may be configured to determine that the at least one first available slot and the at least one second available slot overlap in time by at least one time-overlapping slot. The second determining module 804 may be configured to determine whether the at least one time-overlapping slot is used for the first uplink transmission or the second uplink transmission based on one or more collision handling rules. The transmitting module 805 may be configured to transmit the first uplink transmission and/or the second uplink transmission to a network device.

In an embodiment, the terminal device 800 may further comprise a first re-obtaining module 806 configured to re-obtain at least one available slot for the second uplink transmission when the at least one time-overlapping slot is used for the first uplink transmission and a corresponding part transmission of the second uplink transmission is cancelled.

In an embodiment, the terminal device 800 may further comprise a second re-obtaining module 807 configured to re-obtain at least one available slot for the first uplink transmission when the at least one time-overlapping slot is used for the second uplink transmission and a corresponding part transmission of the first uplink transmission is cancelled.

In an embodiment, the terminal device 800 may further comprise a first canceling module 808 configured to cancel at least a part of data transmission of the second uplink transmission when the at least one time-overlapping slot is used for the first uplink transmission.

In an embodiment, the terminal device 800 may further comprise a second canceling module 809 configured to cancel at least a part of data transmission of the first uplink transmission when the at least one time-overlapping slot is used for the second uplink transmission.

Figure 8B:
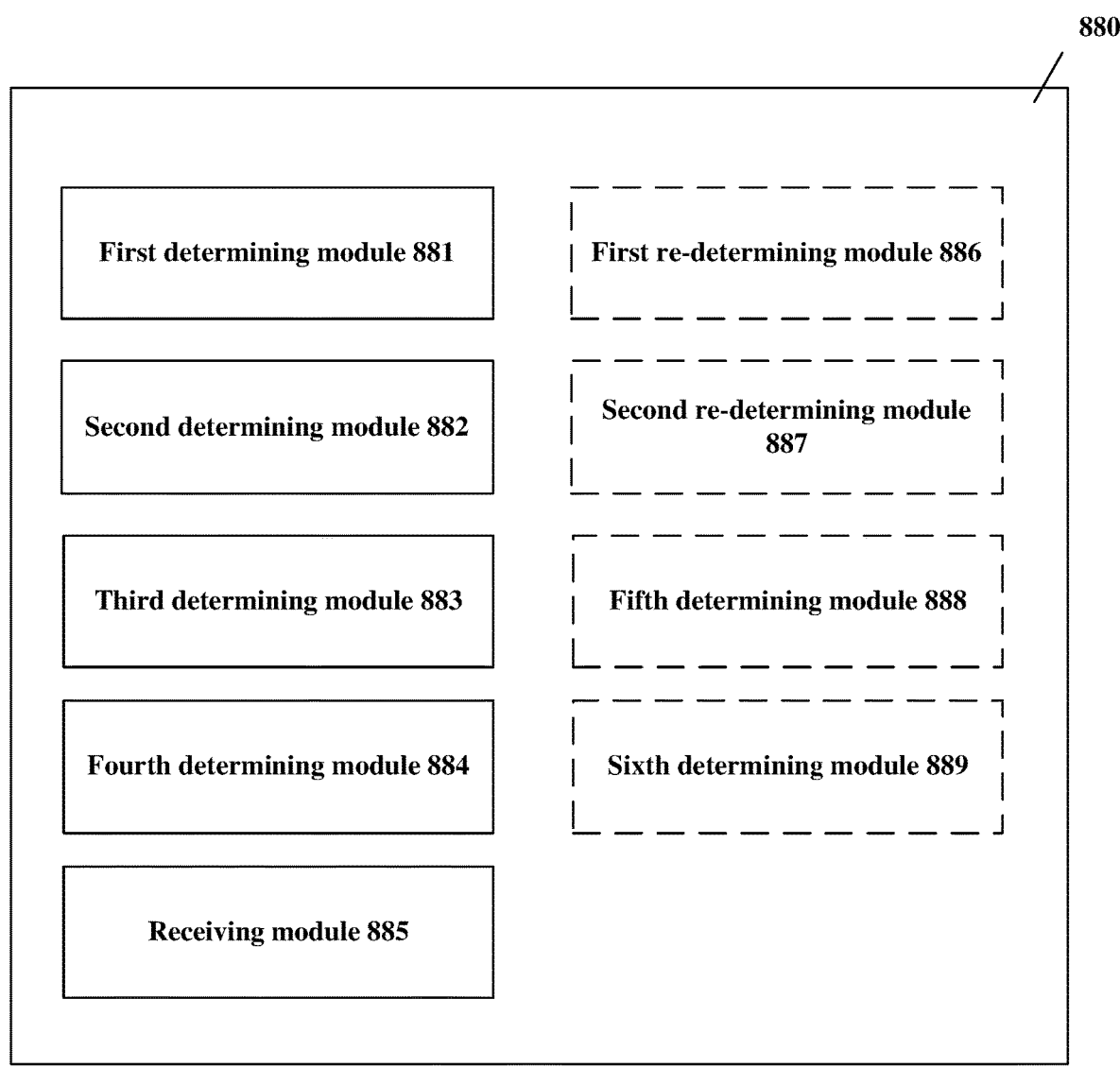
FIG. 8b is a block diagram showing a network device according to an embodiment of the disclosure.

FIG. 8b is a block diagram showing a network device according to an embodiment of the disclosure. As shown, the network device 880 comprises a first determining module 881, a second determining module 882, a third determining module 883, a fourth determining module 884 and a receiving module 885. The first determining module 881 may be configured to determine at least one first available slot for a first uplink transmission. The second determining module 882 may be configured to determine at least one second available slot for a second uplink transmission. The third determining module 883 may be configured to determine that the at least one first available slot and the at least one second available slot overlap in time by at least one time-overlapping slot. The fourth determining module 884 may be configured to determine whether the at least one time-overlapping slot is used for the first uplink transmission or the second uplink transmission based on one or more collision handling rules. The receiving module 885 may be configured to receive the first uplink transmission and/or the second uplink transmission from a terminal device.

In an embodiment, the network device 880 may further comprise a first re-determining module 886 configured to re-determine at least one available slot for the second uplink transmission when the at least one time-overlapping slot is used for the first uplink transmission and a corresponding part transmission of the second uplink transmission is cancelled.

In an embodiment, the network device 880 may further comprise a second re-determining module 887 configured to re-determine at least one available slot for the first uplink transmission when the at least one time-overlapping slot is used for the second uplink transmission and a corresponding part transmission of the first uplink transmission is cancelled.

In an embodiment, the network device 880 may further comprise a fifth determining module 888 configured to determine at least a part of data transmission of the second uplink transmission is canceled when the at least one time-overlapping slot is used for the first uplink transmission.

In an embodiment, the network device 880 may further comprise a sixth determining module 889 configured to determine at least a part of data transmission of the first uplink transmission is canceled when the at least one time-overlapping slot is used for the second uplink transmission.

The term unit or module may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With function units, the terminal device and the network device may not need a fixed processor or memory, any computing resource and storage resource may be arranged from the terminal device and the network device in the communication system. The introduction of virtualization technology and network computing technology may improve the usage efficiency of the network resources and the flexibility of the network.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

Further, the exemplary overall commutation system including the terminal device and the network device will be introduced as below.

Embodiments of the present disclosure provide a communication system including a host computer including: processing circuitry configured to provide user data; and a communication interface configured to forward the user data to a cellular network for transmission to a terminal device. The cellular network includes a base station such as the network device above mentioned, and/or the terminal device such as the terminal device and the relay terminal device above mentioned.

In embodiments of the present disclosure, the system further includes the terminal device, wherein the terminal device is configured to communicate with the base station.

In embodiments of the present disclosure, the processing circuitry of the host computer is configured to execute a host application, thereby providing the user data; and the terminal device includes processing circuitry configured to execute a client application associated with the host application.

Embodiments of the present disclosure also provide a communication system including a host computer including: a communication interface configured to receive user data originating from a transmission from a terminal device; a base station. The transmission is from the terminal device to the base station. The base station is above mentioned, and/or the terminal device is above mentioned.

In embodiments of the present disclosure, the processing circuitry of the host computer is configured to execute a host application. The terminal device is configured to execute a client application associated with the host application, thereby providing the user data to be received by the host computer.

Figure 9:
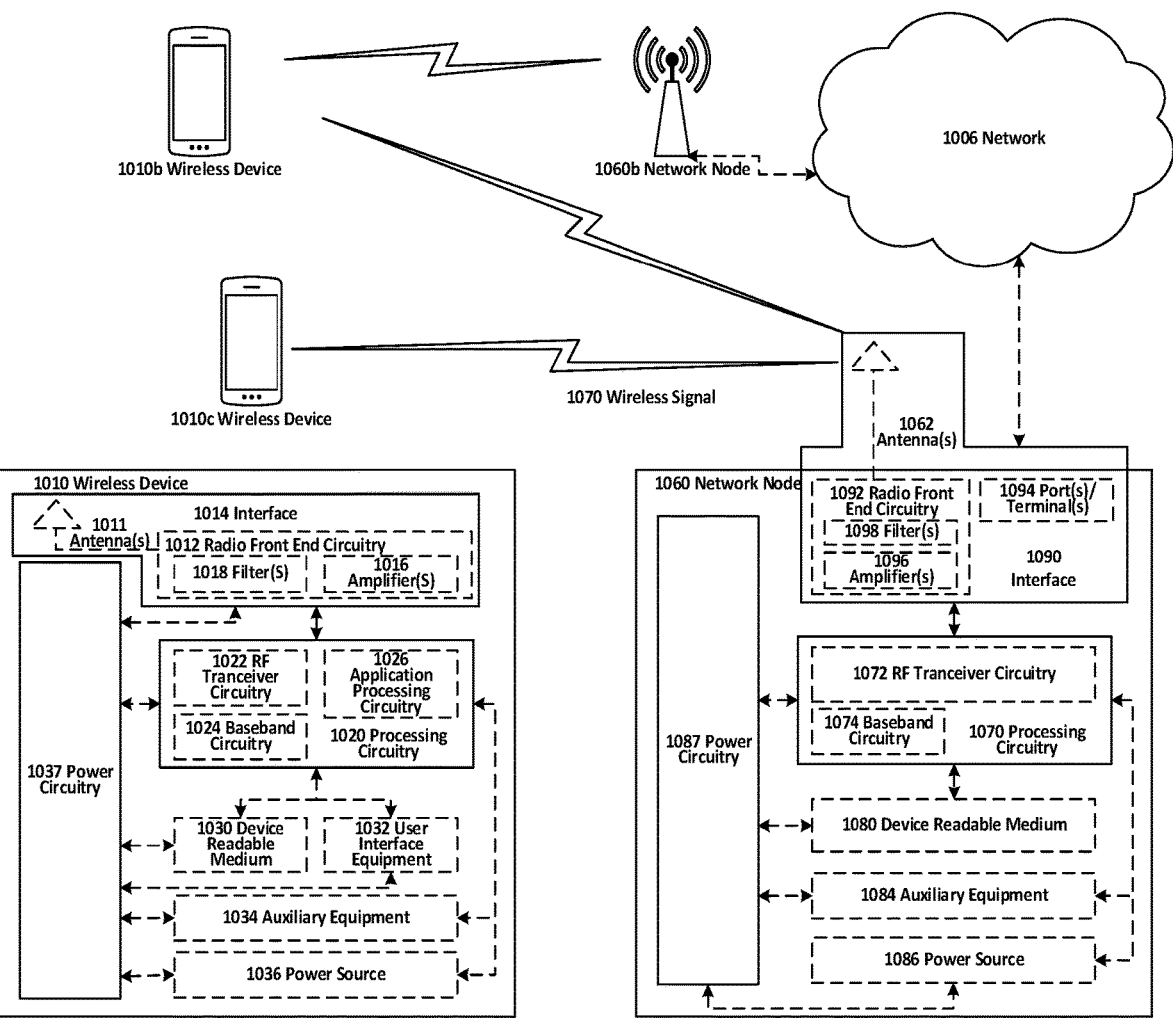
FIG. 9 is a schematic showing a wireless network in accordance with some embodiments.

FIG. 9 is a schematic showing a wireless network in accordance with some embodiments.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 1006, network nodes 1060 (corresponding to network side node) and 1060b, and WDs (corresponding to terminal device) 1010, 1010b, and 1010c. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/ or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 9 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IOT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IOT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 10:
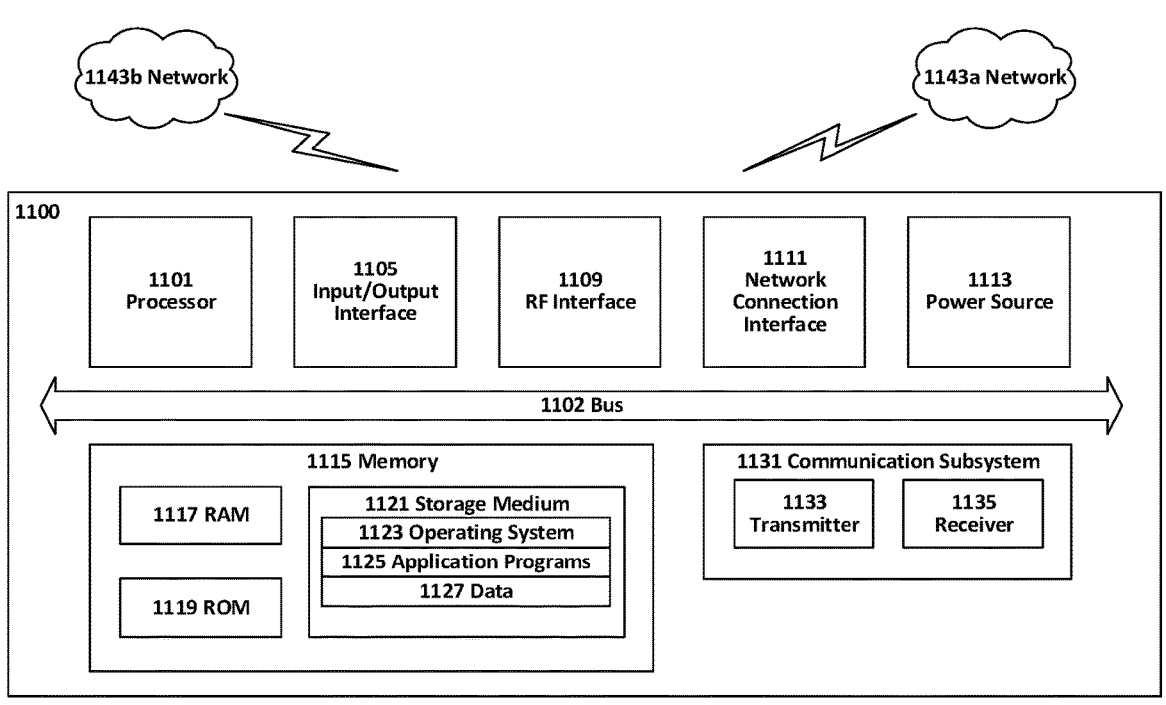
FIG. 10 is a schematic showing a user equipment in accordance with some embodiments.

FIG. 10 is a schematic showing a user equipment in accordance with some embodiments.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1100 may be any UE identified by the 3rd Generation Partnership Project (3GPP), including a NB-IOT UE, a machine type communication (MTC) UE, and/or an enhanced MTC (eMTC) UE. UE 1100, as illustrated in FIG. 10, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1109 may be configured to provide a communication interface to RF components such as a transmitter, a receiver, and an antenna. Network connection interface 1111 may be configured to provide a communication interface to network 1143 a. Network 1143 a may encompass wired and/or wireless networks such as a local-area network (LAN), a wide-area network (WAN), a computer network, a wireless network, a telecommunications network, another like network or any combination thereof. For example, network 1143 a may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 10, processing circuitry 1101 may be configured to communicate with network 1143b using communication subsystem 1131. Network 1143a and network 1143b may be the same network or networks or different network or networks. Communication subsystem 1131 may be configured to include one or more transceivers used to communicate with network 1143b. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143b may encompass wired and/or wireless networks such as a local-area network (LAN), a wide-area network (WAN), a computer network, a wireless network, a telecommunications network, another like network or any combination thereof. For example, network 1143b may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 11:
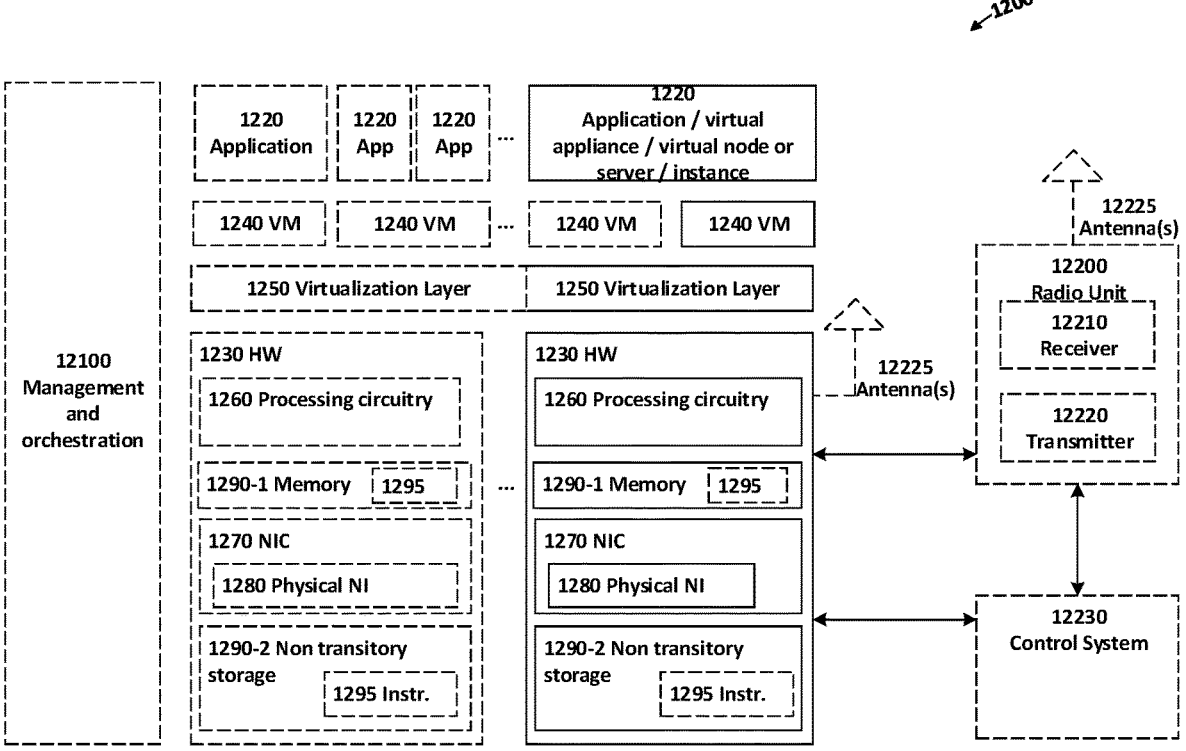
FIG. 11 is a schematic showing a virtualization environment in accordance with some embodiments.

FIG. 11 is a schematic showing a virtualization environment in accordance with some embodiments.

FIG. 11 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290-1. Memory 1290-1 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 11, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 11.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signalling can be effected with the use of control system 12230 which may alternatively be used for communication between the hardware nodes 1230 and radio units 12200.

Figure 12:
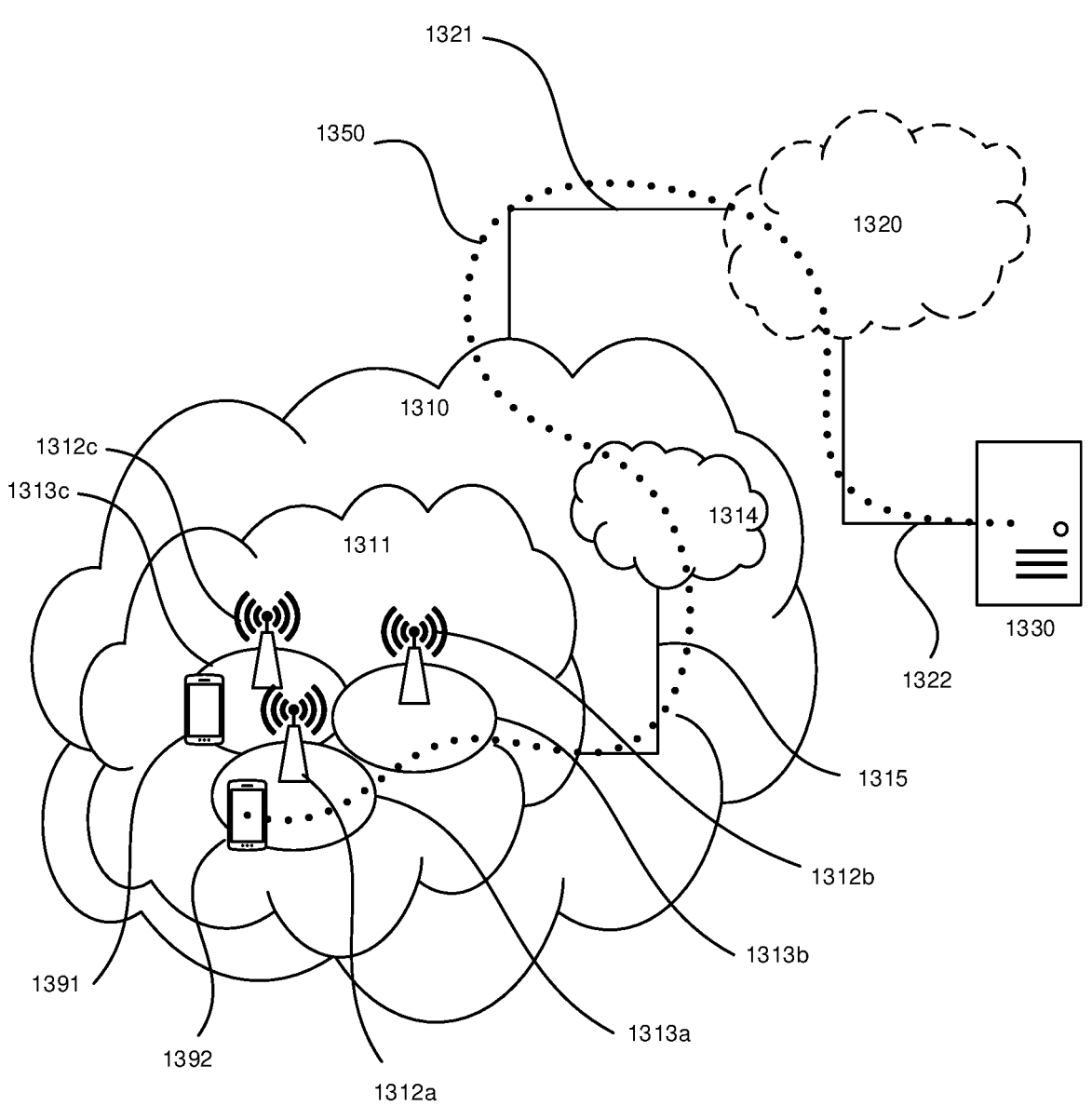
FIG. 12 is a schematic showing a telecommunication network connected via an intermediate network to a host computer in accordance with some embodiments.

FIG. 12 is a schematic showing a telecommunication network connected via an intermediate network to a host computer in accordance with some embodiments.

With reference to FIG. 12, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to core network 1314 over a wired or wireless connection 1315. A first UE 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312a or 1312b or 1312c.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 12 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signalling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312a or 1312b or 1312c may not or need not be informed about the past routing of an incoming downlink communication with data originating from host computer 1330 to be forwarded (e.g., handed over) to a connected UE 1391. Similarly, base station 1312a or 1312b or 1312c need not be aware of the future routing of an outgoing uplink communication originating from the UE 1391 towards the host computer 1330.

Figure 13:
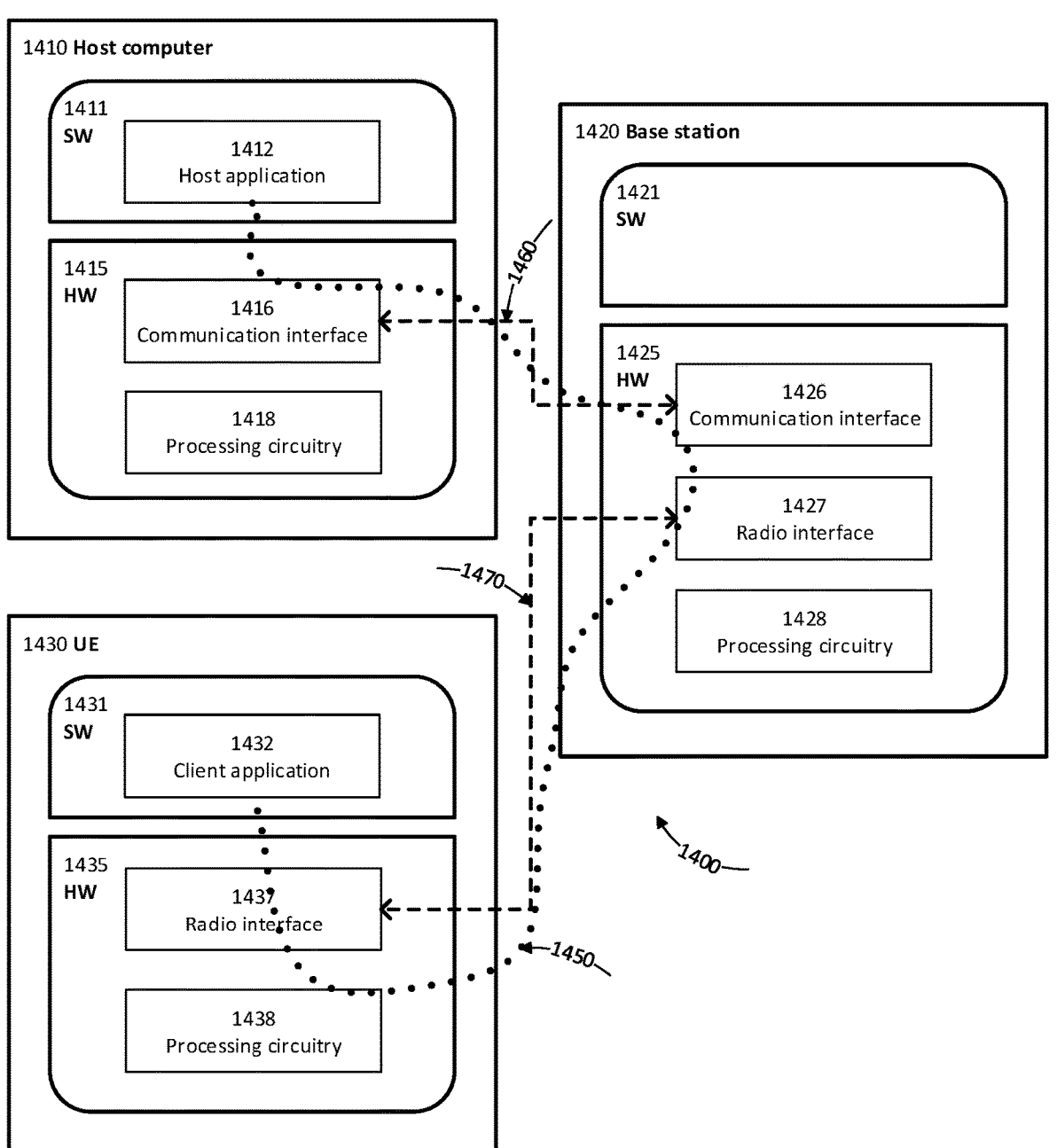
FIG. 13 is a schematic showing a host computer communicating via a base station with a user equipment over a partially wireless connection in accordance with some embodiments.

FIG. 13 is a schematic showing a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 13. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 13) served by base station 1420. Communication interface 1426 may be configured to facilitate connection 1460 to host computer 1410. Connection 1460 may be direct or it may pass through a core network (not shown in FIG. 13) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 13 may be similar or identical to host computer 1330, one of base stations 1312*a*, 1312*b*, 1312*c* and one of UEs 1391, 1392 of FIG. 12, respectively. This is to say, the inner workings of these entities may be as shown in FIG. 13 and independently, the surrounding network topology may be that of FIG. 12.

In FIG. 13, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the latency, and power consumption for a reactivation of the network connection, and thereby provide benefits, such as reduced user waiting time, enhanced rate control.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signalling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 14:
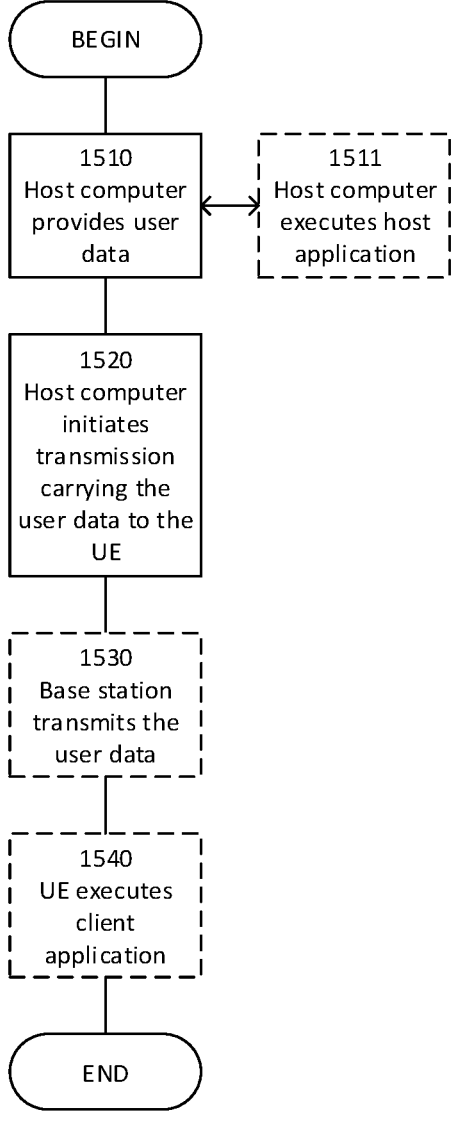
FIG. 14 is a schematic showing methods implemented in a communication system including a host computer, a base station and a user equipment in accordance with some embodiments.

FIG. 14 is a schematic showing methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 15:
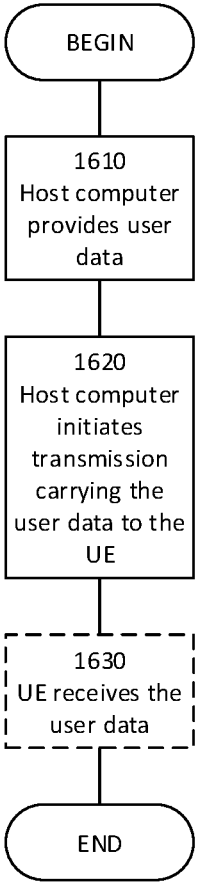
FIG. 15 is a schematic showing methods implemented in a communication system including a host computer, a base station and a user equipment in accordance with some embodiments.

FIG. 15 is a schematic showing methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 16:
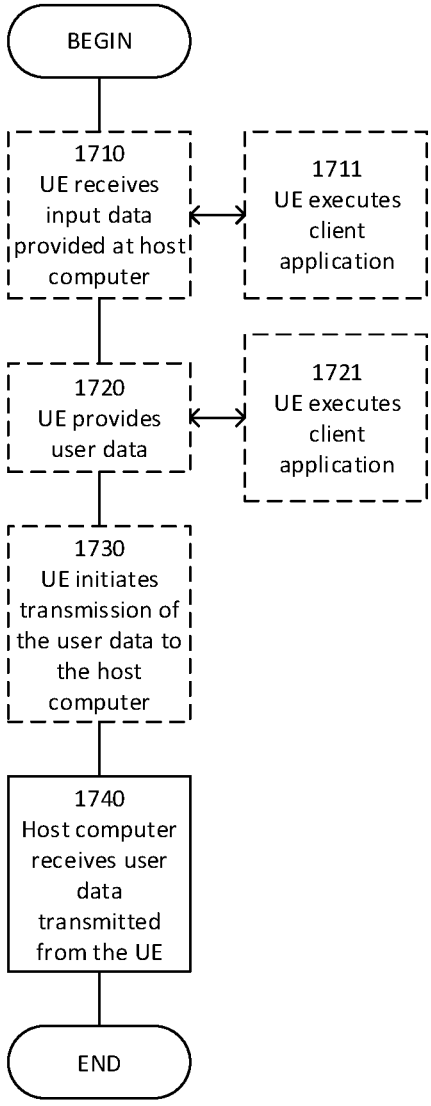
FIG. 16 is a schematic showing methods implemented in a communication system including a host computer, a base station and a user equipment in accordance with some embodiments.

FIG. 16 is a schematic showing methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 17:
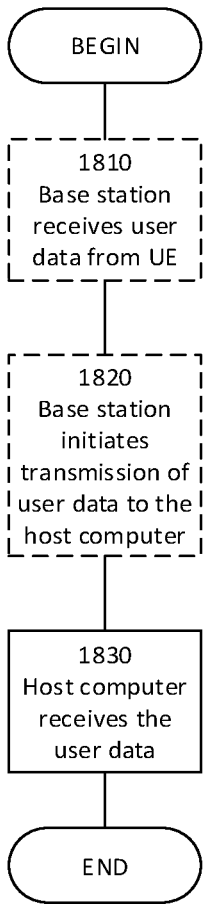
FIG. 17 is a schematic showing methods implemented in a communication system including a host computer, a base station and a user equipment in accordance with some embodiments.

FIG. 17 is a schematic showing methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking +and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

The invention claimed is:

1. A method performed by a terminal device, comprising:
   receiving a configuration of a number of repetitions of a first uplink transmission;
   determining one or more first available slots that are available for the number of repetitions of the first uplink transmission;
   determining one or more second available slots that are available for a second uplink transmission;
   after determining the one or more first available slots and the one or more second available slots, determining that the one or more first available slots and the one or more second available slots overlap in time by at least one time-overlapping slot;
   determining, based on one or more collision handling rules, whether the at least one time-overlapping slot is used for at least one repetition of the first uplink transmission or is used for the second uplink transmission, with the at least one repetition of the first uplink transmission still counting towards satisfying the number of repetitions configured for the first uplink transmission according to the configuration irrespective of whether the at least one time-overlapping slot is used for the at least one repetition of the first uplink transmission or is used for the second uplink transmission; and
   transmitting the first uplink transmission and/or the second uplink transmission to a network device.

2. The method according to claim 1, wherein at least one of the one or more collision handling rules is configured by the network device, wherein the at least one of the one or more collision handling rules is configured in at least one of:
   a non-physical layer signaling, or
   a physical layer signaling.

3. The method of claim 1, wherein the first uplink transmission comprises a Physical Uplink Shared Channel (PUSCH) repetition Type A transmission.

4. The method of claim 3, wherein the second uplink transmission comprises either:
   uplink transmission for semi-persistent scheduling (SPS) hybrid automatic repeat request (HARQ)-acknowledgement (ACK), or
   uplink transmission for Sounding Reference Signal (SRS).

5. The method of claim 4, wherein determining whether the at least one time-overlapping slot is used for at least one repetition of the first uplink transmission or is used for the second uplink transmission comprises performing collision handling between the PUSCH repetition Type A transmission and the uplink transmission for SPS HARQ-ACK or SRS after determining the one or more first available slots for counting repetitions of the PUSCH repetition Type A transmission for satisfying the number of repetitions configured for the PUSCH repetition Type A transmission.

6. The method of claim 4, wherein the second uplink transmission comprises uplink transmission for SRS, and wherein the one or more second available slots comprise one or more slots that:
   (i) include uplink symbols or flexible symbols at time-domain locations corresponding to all SRS resources of an SRS resource set associated with the second uplink transmission; and
   (ii) satisfy a terminal-device capability related to a minimum timing requirement between a triggering downlink control channel and the SRS resources.

7. The method of claim 1, wherein determining whether the at least one time-overlapping slot is used for at least one repetition of the first uplink transmission or is used for the second uplink transmission comprises determining, based on the one or more collision handling rules, to use the at least one time-overlapping slot for the second uplink transmission and cancel the at least one repetition of the first uplink transmission in the at least one time-overlapping slot, but the at least one repetition of the first uplink transmission is still counted towards satisfying the number of repetitions configured for the first uplink transmission according to the configuration.

8. The method of claim 1, wherein the configuration is a Radio Resource Control (RRC) configuration.

9. The method of claim 1, wherein determining the one or more first available slots is performed based on both semi-static signaling and dynamic signaling.

10. The method of claim 1, wherein the first uplink transmission comprises a Physical Uplink Shared Channel (PUSCH) repetition Type A transmission, and wherein a redundancy version, RV, pattern for the PUSCH repetition Type A transmission is determined by cycling through the RV pattern based on the one or more first available slots, with the at least one repetition of the PUSCH repetition Type A transmission in the at least one time-overlapping slot still counted for RV cycling irrespective of whether the at least one time-overlapping slot is used for the at least one repetition of the PUSCH repetition Type A transmission.

11. A method performed by a network device, the method comprising:
   transmitting, to a terminal device, a configuration of a number of repetitions of a first uplink transmission;
   determining one or more first available slots that are available for the number of repetitions of the first uplink transmission;
   determining one or more second available slots that are available for a second uplink transmission;
   after determining the one or more first available slots and the one or more second available slots, determining that the one or more first available slots and the one or more second available slots overlap in time by at least one time-overlapping slot;
   determining, based on one or more collision handling rules, whether the at least one time-overlapping slot is used for at least one repetition of the first uplink transmission or is used for the second uplink transmission, with the at least one repetition of the first uplink transmission still counting towards satisfying the number of repetitions configured for the first uplink transmission according to the configuration irrespective of whether the at least one time-overlapping slot is used for the at least one repetition of the first uplink transmission or is used for the second uplink transmission; and receiving the first uplink transmission and/or the second uplink transmission from the terminal device.

12. The method according to claim 11, wherein at least one of the one or more collision handling rules is configured by the network device, wherein the at least one of the one or more collision handling rules is configured in at least one of:

a non-physical layer signaling, or a physical layer signaling.

13. A terminal device comprising:

a processor; and a memory coupled to the processor, said memory containing instructions executable by said processor, whereby said terminal device is operative to:

receive a configuration of a number of repetitions of a first uplink transmission;

determine one or more first available slots that are available for the number of repetitions of the first uplink transmission;

determine one or more second available slots that are available for a second uplink transmission;

after determining the one or more first available slots and the one or more second available slots, determine that the one or more first available slots and the one or more second available slots overlap in time by at least one time-overlapping slot;

determine, based on one or more collision handling rules, whether the at least one time-overlapping slot is used for at least one repetition of the first uplink transmission or is used for the second uplink transmission, with the at least one repetition of the first uplink transmission still counting towards satisfying the number of repetitions configured for the first uplink transmission according to the configuration irrespective of whether the at least one time-overlapping slot is used for the at least one repetition of the first uplink transmission or is used for the second uplink transmission; and transmit the first uplink transmission and/or the second uplink transmission to a network device.

14. The terminal device of claim 13, wherein the first uplink transmission comprises a Physical Uplink Shared Channel (PUSCH) repetition Type A transmission.

15. The terminal device of claim 14, wherein the second uplink transmission comprises either:

uplink transmission for semi-persistent scheduling (SPS) hybrid automatic repeat request (HARQ)-acknowledgement (ACK), or uplink transmission for Sounding Reference Signal (SRS).

16. The terminal device of claim 15, said memory containing instructions executable by said processor, whereby said terminal device is operative to determine whether the at least one time-overlapping slot is used for the at least one repetition of the first uplink transmission or is used for the second uplink transmission as part performing collision handling between the PUSCH repetition Type A transmission and the uplink transmission for SPS HARQ-ACK or SRS after determining the one or more first available slots for counting repetitions of the PUSCH repetition Type A transmission for satisfying the number of repetitions configured for the PUSCH repetition Type A transmission.

17. The terminal device of claim 15, wherein the second uplink transmission comprises uplink transmission for SRS, and wherein the one or more second available slots comprise one or more slots that:

(i) include uplink symbols or flexible symbols at time-domain locations corresponding to all SRS resources of an SRS resource set associated with the second uplink transmission; and (ii) satisfy a terminal-device capability related to a minimum timing requirement between a triggering downlink control channel and the SRS resources.

18. The terminal device of claim 13, said memory containing instructions executable by said processor, whereby said terminal device is operative to determine whether the at least one time-overlapping slot is used for the at least one repetition of the first uplink transmission or is used for the second uplink transmission as part of determining, based on the one or more collision handling rules, to use the at least one time-overlapping slot for the second uplink transmission and cancel the at least one repetition of the first uplink transmission in the at least one time-overlapping slot, but the at least one repetition of the first uplink transmission is still counted towards satisfying the number of repetitions configured for the first uplink transmission according to the configuration.

19. The terminal device of claim 13, wherein the configuration is a Radio Resource Control (RRC) configuration.

20. The terminal device of claim 13, said memory containing instructions executable by said processor, whereby said terminal device is operative to determine the one or more first available slots based on both semi-static signaling and dynamic signaling.

21. The terminal device of claim 13, wherein the first uplink transmission comprises a Physical Uplink Shared Channel (PUSCH) repetition Type A transmission, and wherein said memory contains instructions executable by said processor, whereby said terminal device is operative to determine a redundancy version, RV, pattern for the PUSCH repetition Type A transmission by cycling through the RV pattern based on the one or more first available slots, with the at least one repetition of the PUSCH repetition Type A transmission in the at least one time-overlapping slot still counted for RV cycling irrespective of whether the at least one time-overlapping slot is used for the at least one repetition of the PUSCH repetition Type A transmission.

22. A network device comprising:

a processor; and a memory coupled to the processor, said memory containing instructions executable by said processor, whereby said network device is operative to:

transmit, to a terminal device, a configuration of a number of repetitions of a first uplink transmission;

determine one or more first available slots that are available for the number of repetitions of the first uplink transmission;

determine one or more second available slots that are available for a second uplink transmission;

after determining the one or more first available slots and the one or more second available slots, determine that the one or more first available slots and the one or more second available slots overlap in time by at least one time-overlapping slot;

determine, based on one or more collision handling rules, whether the at least one time-overlapping slot is used for at least one repetition of the first uplink transmission or is used for the second uplink transmission, with the at least one repetition of the first uplink transmission still counting towards satisfying the number of repetitions configured for the first uplink transmission according to the configuration irrespective of whether the at least one time-overlapping slot is used for the at least one repetition of the first uplink transmission or is used for the second uplink transmission; and receive the first uplink transmission and/or the second uplink transmission from the terminal device.

* * * * *